(12) United States Patent
Ueda et al.

(10) Patent No.: US 8,615,351 B2
(45) Date of Patent: Dec. 24, 2013

(54) DRIVING ASSISTANCE APPARATUS AND VEHICLE DRIVING ASSISTANCE SYSTEM FOR DETERMINING ENTRY INTO OR EXIT FROM A PARKING LOT

(75) Inventors: Yusuke Ueda, Nishio (JP); Motonori Tominaga, Anjo (JP); Norio Sanma, Okazaki (JP); Tatsuru Kuwabara, Takahama (JP); Hirotane Ikeda, Nagoya (JP)

(73) Assignees: Nippon Soken, Inc., Nishio (JP); DENSO CORPORATION, Kariya (JP)

( * ) Notice: Subject to any disclaimer, the term of this patent is extended or adjusted under 35 U.S.C. 154(b) by 107 days.

(21) Appl. No.: 13/306,008

(22) Filed: Nov. 29, 2011

(65) Prior Publication Data
US 2012/0143456 A1 Jun. 7, 2012

(30) Foreign Application Priority Data
Dec. 1, 2010 (JP) .................. 2010-268505

(51) Int. Cl.
*B60W 40/06* (2012.01)
*B60W 50/12* (2012.01)

(52) U.S. Cl.
CPC ............... *B60W 40/06* (2013.01); *B60W 50/12* (2013.01); *B60W 2520/28* (2013.01)
USPC ............... 701/93; 701/80; 701/300; 701/494; 701/498; 701/499

(58) Field of Classification Search
CPC ......... B60T 2210/12; B60T 2210/124; B60W 40/06; B60W 50/12; B60W 2520/28; G01C 21/165; G01C 21/16; G05D 13/00; G05D 13/66; G08G 1/14

USPC ............... 701/93, 73, 80, 300, 494, 498, 499
See application file for complete search history.

(56) References Cited

U.S. PATENT DOCUMENTS

| | | | | |
|---|---|---|---|---|
| 7,206,702 B2 * | 4/2007 | Isono et al. | ..................... | 702/41 |
| 7,278,316 B2 * | 10/2007 | Satou et al. | ..................... | 73/669 |
| 8,046,160 B2 * | 10/2011 | Carter et al. | ................... | 701/498 |
| 8,234,051 B2 * | 7/2012 | Fujita et al. | ..................... | 701/71 |
| 2002/0169552 A1 | 11/2002 | Hashida | | |
| 2007/0050110 A1 * | 3/2007 | Kondoh et al. | ................... | 701/36 |

FOREIGN PATENT DOCUMENTS

| | | |
|---|---|---|
| JP | A-5-172570 | 7/1993 |
| JP | 10272913 A * | 10/1998 |
| JP | 11278092 A * | 10/1999 |

(Continued)

*Primary Examiner* — James Trammell
*Assistant Examiner* — Todd Melton
(74) *Attorney, Agent, or Firm* — Posz Law Group, PLC

(57) ABSTRACT

A driving assistance apparatus mounted to a vehicle is disclosed. The apparatus determines whether an amount of change in tire wheel speed of each tire wheel of the vehicle exceeds a threshold. The apparatus specifies a tire wheel crossing order, which is an order in which the tire wheels of the vehicle cross over a level difference between a road and a parking lot when the vehicle crosses over the level difference. The apparatus determines whether or not the vehicle has crossed over the level difference between the road and the parking lot, based on whether a threshold-exceeding order is identical to the specified tire wheel crossing order. The threshold-exceeding order is an order in which the amounts of change in the tire wheel speed of the respective tire wheels exceed the threshold.

14 Claims, 12 Drawing Sheets

(56) References Cited

FOREIGN PATENT DOCUMENTS

| JP | A-2000-351378 | | | 12/2000 |
| JP | 2003014479 | A | * | 1/2003 |
| JP | A-2003-63338 | | | 3/2003 |
| JP | 2004184089 | A | * | 7/2004 |
| JP | A-2004-184089 | | | 7/2004 |
| JP | 2004224306 | A | * | 8/2004 |
| JP | 2005196326 | A | * | 7/2005 |
| JP | 2007030609 | A | * | 2/2007 |
| JP | A-2007-332837 | | | 12/2007 |
| JP | A-2008-74275 | | | 4/2008 |
| JP | 2009264352 | A | * | 11/2009 |

* cited by examiner

DRIVING ASSISTANCE APPARATUS AND VEHICLE DRIVING ASSISTANCE SYSTEM FOR DETERMINING ENTRY INTO OR EXIT FROM A PARKING LOT

CROSS REFERENCE TO RELATED APPLICATION

The present application is based on and claims priority to Japanese Patent Application No. 2010-268505 filed on Dec. 1, 2010, disclosure of which is incorporated herein by reference.

TECHNICAL FIELD

The present disclosure relates to a driving assistance apparatus and a driving assistance system.

BACKGROUND

An apparatus for determining vehicle's entry into a parking lot and vehicle's exit from the parking lot is known. For example, Patent Document 1 (JP-2004-184089A) discloses the following technique. When an acceleration change detected with an acceleration sensor exceeds a predetermined value, it is estimated that a vehicle has crossed over a roadside ditch. Based on an estimation result, it is determined whether or not the vehicle is on a road or outside the road.

Patent Document 2 (JP-2002-333334A corresponding to US 2002/0169552A) discloses a technique for determining entry into and exit from a parking lot by taking together a vehicle speed of the vehicle, a presence or absence of turning movement, an error in a vehicle longitudinal direction estimated by map matching, a presence or absence of front or rear intersection, and a cross-road width.

The technique disclosed in Patent Document 1 uses an acceleration sensor that detects vertical direction acceleration in accordance with up and down movement of a vehicle. However, in many cases, the acceleration sensor for detecting the vertical direction acceleration is not installed in a vehicle. Cost for additional installation of this acceleration sensor is needed. Therefore, the technique disclosed in Patent Document 1 disadvantageously requires high cost.

The technique disclosed in Patent Document 2 uses a map matching process of an in-vehicle navigation apparatus, and an intersection data or a road width data handled by the in-vehicle navigation apparatus. Thus, the in-vehicle navigation apparatus should be equipped in a vehicle. Therefore, the technique disclosed in Patent Document 2 disadvantageously requires high cost.

SUMMARY

In view of the foregoing, it is an objective of the present disclosure to provide a driving assistance apparatus and a driving assistance system that can determine entry of a vehicle into a parking lot and exit of a vehicle from a parking lot, and that can be available at a low cost.

According to a first example of the present disclosure, a driving assistance apparatus mounted to a vehicle includes a tire wheel speed detection section, a tire wheel speed change calculation section, a threshold determination section, an order specifying section and a level difference crossing determination section. The tire wheel speed detection section is configured to successively detect tire wheel speed of each tire wheel of tire wheels of the vehicle. The tire wheels of the vehicle include at least one front tire wheel and at least one rear tire wheel. The tire wheel speed change calculation section is configured to calculate an amount of change in the tire wheel speed, which is detected with the tire wheel speed detection section, of each tire wheel. The threshold determination section is configured to determine whether or not the amount of change in the tire wheel speed of each tire wheel, which is calculated by the tire wheel speed change calculation section, exceeds a threshold. The order specifying section is configured to specify a tire wheel crossing order. The tire wheel crossing order is an order in which the tire wheels of the vehicle cross over a level difference between a road and a parking lot when the vehicle crosses over the level difference. The level difference crossing determination section is configured to determine whether or not the vehicle has crossed over the level difference between the road and the parking lot, based on whether or not a threshold-exceeding order is identical to the tire wheel crossing order specified by the order specifying section. The threshold-exceeding order is an order in which the threshold determination section determines that the amounts of change in the tire wheel speed of the respective tire wheels exceed the threshold.

According to a second example of the present disclosure, a driving assistance apparatus mounted to a vehicle includes a tire wheel speed detection section, a turn state detection section, a vehicle speed detection section, a parking lot entry possibility detection section, an origin point determination section, a coordinate point calculation section, and an after-stop movement detection section. The tire wheel speed detection section is configured to successively detect tire wheel speed of a tire wheel of the vehicle. The turn state detection section is configured to successively detect a turn direction and a degree of turn of the vehicle. The vehicle speed detection section is configured to successively detect vehicle speed of the vehicle. The parking lot entry possibility detection section is configured to estimate whether or not the vehicle is going to enter a parking lot from a road. The origin point determination section is configured to determine a specific point as a point of origin of an absolute coordinate system. The specific point is a point at which the parking lot entry possibility detection section estimates that the vehicle is going to enter the parking lot from the road. The coordinate point calculation section is configured to successively calculate a present coordinate point of the vehicle in the absolute coordinate system having the determined point of origin based on (i) the tire wheel speed, which is successively detected with the tire wheel speed detection section, and (ii) the turn direction and the degree of turn, which are successively detected with the turn state detection section. The after-stop movement detection section is configured to detect whether or not the vehicle starts moving after stopping or parking. The exit determination section is configured to make an exit determination of whether or not the vehicle has exited the parking lot based on a positional relation between the point of origin and the coordinate point, which is successively calculated by the coordinate point calculation section. When the after-stop movement detection section detects that the vehicle starts moving after stopping or parking, the exit determination section makes the exit determination.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiment will be described based on the accompanying drawings.

Figure 1:
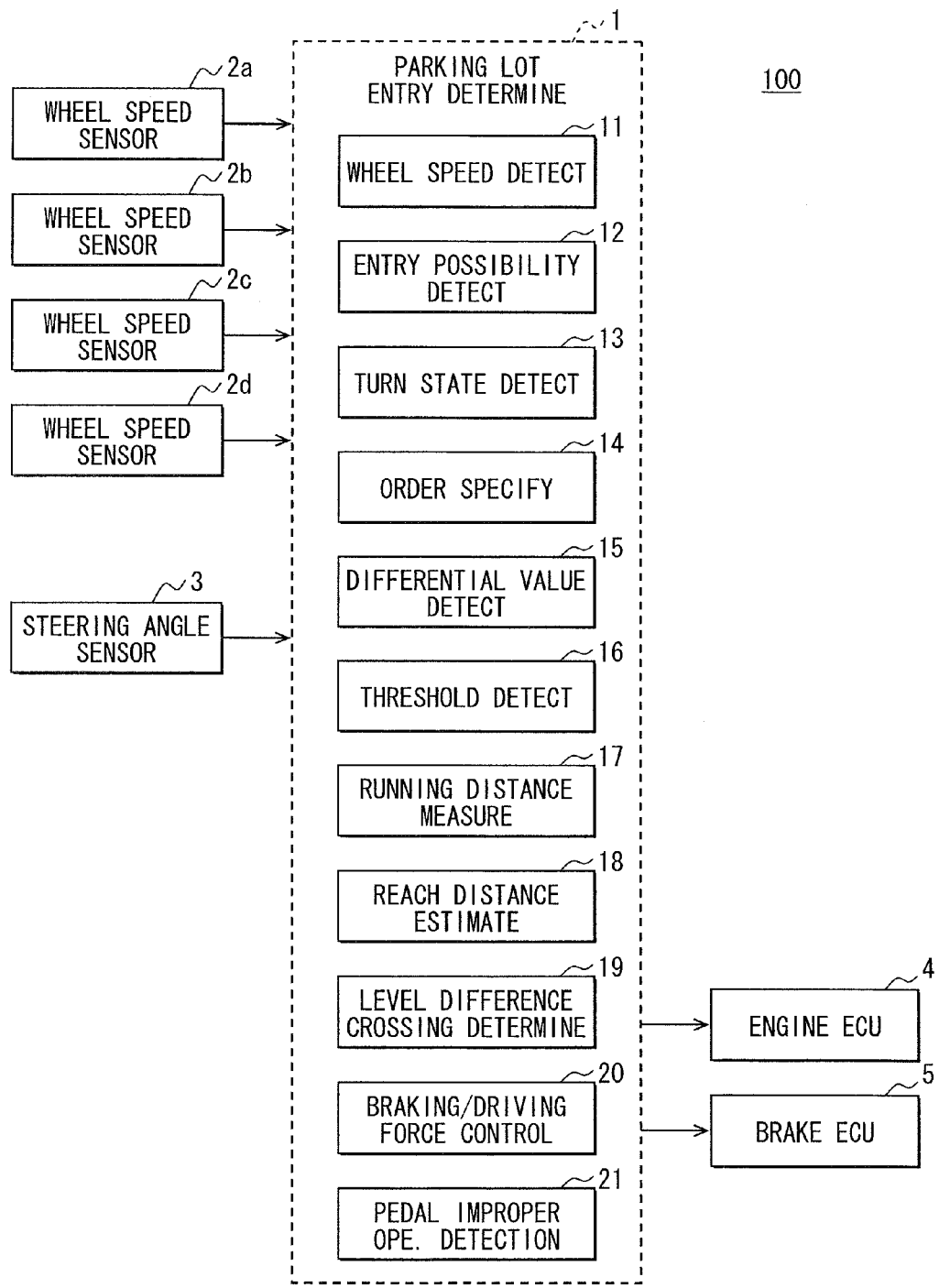
FIG. 1 is a block diagram illustrating one example of a driving assistance system.

FIG. 1 is a block diagram illustrating a schematic configuration of a driving assistance system 100 of one embodiment. The driving assistance system 100 is mounted to a vehicle and includes a parking lot entry determination apparatus 1, wheel speed sensors 2a to 2d, a steering angle sensor 3, an engine electronic control unit (ECU) 4, and a brake ECU 5. The present embodiment is directed to an example where the driving assistance system 100 is applied to a four-wheeled engine-powered vehicle, which uses only an internal combustion engine as its travel power source. The vehicle equipped with the driving assistance system 100 is also referred to herein as a host vehicle.

The wheel speed sensors 2a to 2d are sensors for measuring rotation speed (tire wheel speed) of rolling wheels (tire wheels) of the host vehicle. In the present embodiment, for example, the wheel speed sensors 2a, 2b, 2c, 2d measure the wheel speeds of a front left tire wheel, a front right tire wheel, a rear left tire wheel, and a rear right wheel, respectively.

The steering angle sensor 3 measures a steering angle of a steering wheel of the host vehicle and output a sensor signal, which indicates as the steering angle rotation angle from a neutral position (0 degree) of the steering wheel. The neutral position of the steering wheel is a position when the host vehicle is traveling in a straight line. When the steering wheel is rotated in a counter clockwise direction (also called a left rotation direction) from the neutral position, the steering angle is positive (+). When the steering wheel is rotated in a clockwise direction (also called a right rotation direction) from the neutral position, the steering angle is negative.

The engine ECU 4 includes a microcomputer with a central processing unit (CPU), a read-only memory (ROM), a random access memory (RAM), a back-up RAM and/or the like. Based on inputted information, the engine ECU 4 executes various control programs stored in the ROM, thereby performing various processes relating to engine output control.

The brake ECU 5 includes a microcomputer with a CPU, a ROM, a RAM, a backup RAM and/or the like. Based on inputted information, the brake ECU 5 executes various control programs stored in the ROM, thereby performing various processes relating to control of braking of the host vehicle.

Figure 2:
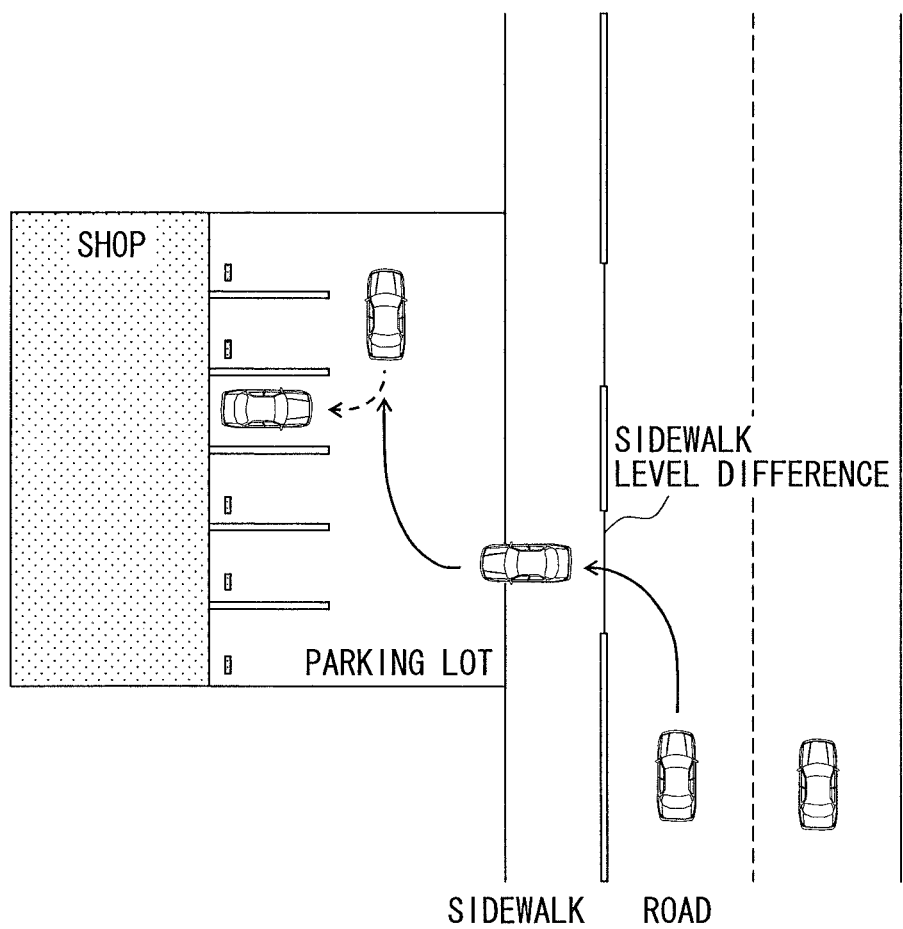
FIG. 2 is a diagram illustrating a situation in which, from a road, a vehicle enters a parking lot of a store adjacent to the road.

The parking lot entry determination apparatus 1 includes a microcomputer with a CPU, a ROM, a RAM, a backup RAM and the like. Based on inputted information, the parking lot entry determination apparatus 1 executes various control programs stored in the ROM, thereby performing various processes. The parking lot entry determination apparatus 1 can determine entry of the host vehicle into a parking lot on a basis that when the host vehicle enters from a road (i.e., street, driveway etc.) into a parking lot of a shop adjacent to the road, the vehicle crosses over a level difference between the road and the parking lot (see FIG. 2). If there is a sidewalk between the parking lot and the street, the above-described level difference refers to a level difference between the street and the sidewalk. If there is no sidewalk between the parking lot and the street, the above-described level difference refers to a level difference between the street and the parking lot. The parking lot entry determination apparatus 1 can correspond to a driving assistance apparatus.

As shown in FIG. 1, the parking lot entry determination apparatus 1 includes a tire wheel speed detection section 11, an entry possibility detection section 12, a turn state detection section 13, an order specifying section 14, a tire wheel speed differential value calculation section 15, a threshold determination section 16, a running distance measurement section 17, a level difference reach distance estimation section 18, a level difference crossing determination section 19, a braking force driving force control section 20, and a pedal improper operation detection section 21. These sections may be functional blocks.

Figure 3:
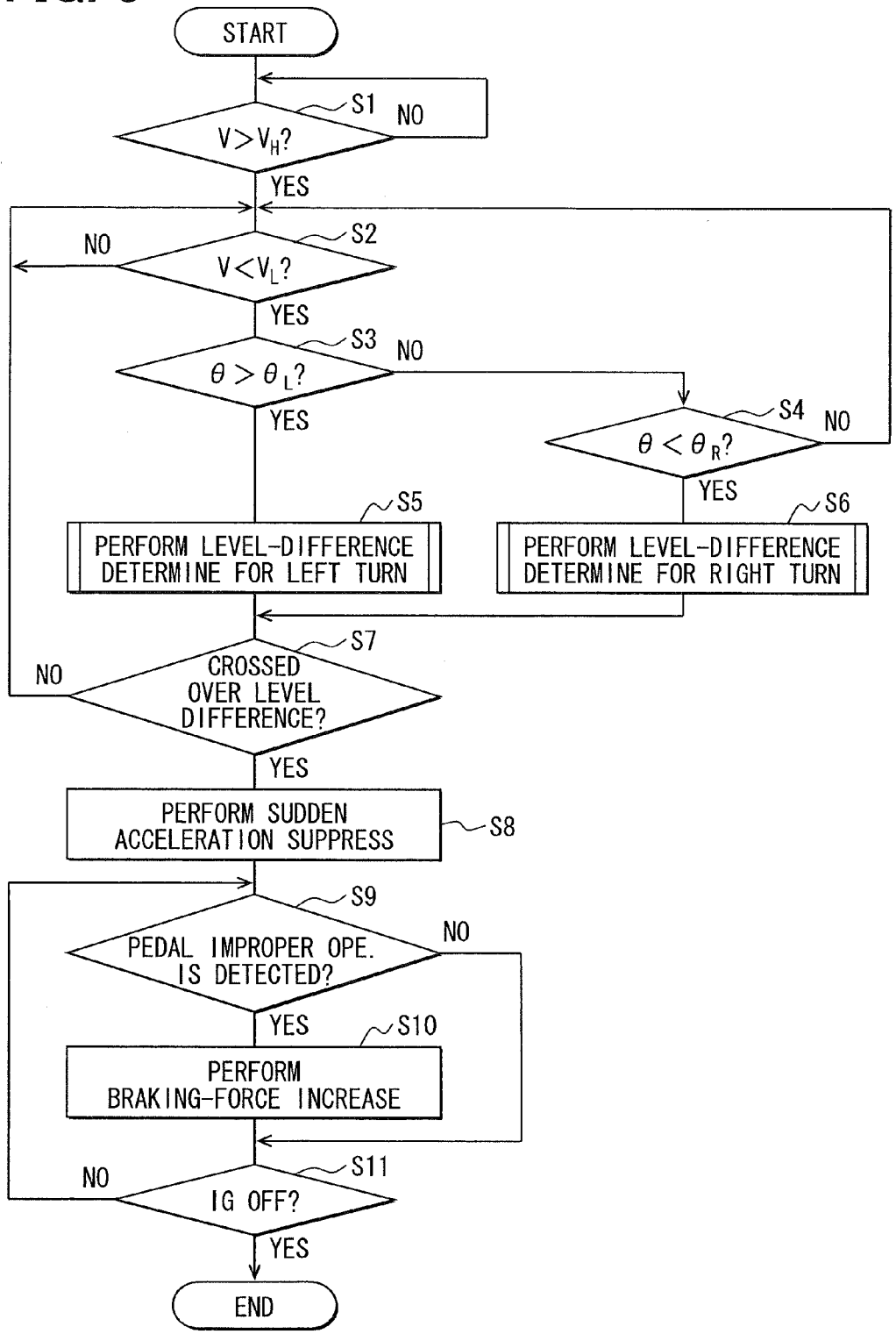
FIG. 3 is a flowchart illustrating an operation procedure of a parking lot entry determination apparatus.

Next, with reference to FIG. 3, an operation procedure of the parking lot entry determination apparatus 1 will be described. FIG. 3 is a flowchart illustrating one example of the operation procedure of the parking lot entry determination apparatus 1. This procedure is started in response to, for example, turning on of an ignition (IG) switch of the host vehicle.

At S1, the tire wheel speed detection section 11 detects the tire wheel speed of each tire wheel based on sensor signals of the wheel speed sensors 2a to 2d. The tire wheel speed detection section 11 can correspond to a tire wheel speed detection means. Furthermore, at S1, the entry possibility detection section 12 calculates an average value V of the tire wheel speeds of the respective tire wheels detected with the tire wheel speed detection section 11, and determines whether or not the calculated average tire wheel speed value V exceeds a predetermined upper limit $V_H$.

In the above, the upper limit $V_H$ may be set to arbitrary tire wheel speed that is larger than an average tire wheel speed at a time when the vehicle speed is under a "slow" traffic sign. For example, the upper limit $V_H$ is set to an average tire wheel speed in the case of the vehicle speed of approximately 30 km/h to approximately 50 km/h. When it is determined that the average tire wheel speed value V exceeds the upper limit $V_H$, corresponding to YES at S1, the procedure proceeds to S2. When it is determined that the average tire wheel speed value V of the tire wheel speed does not exceed the upper limit t $V_H$, corresponding to NO at S1, S1 is repeated.

At S2, the entry possibility detection section 12 performs an entry possibility detection process to detect whether or not there is a possibility that the host vehicle is going to enter a parking lot. The entry possibility detection section 12 can correspond to a parking lot entry possibility detection section or means. In the entry possibility detection process, it is determined whether or not the average tire wheel speed value V calculated at S1 falls below a predetermined lower limit $V_L$. In the above, the predetermined lower limit $V_L$ may be set to approximately an average tire wheel speed at a time when the vehicle speed id under a "slow" traffic sign. For example, the lower limit $V_L$ is set to an average tire wheel speed in the case of the vehicle speed of approximately 20 km/h.

When it is determined that the average tire wheel speed value V falls below the lower limit $V_L$, corresponding to YES at S2, the entry possibility detection section 12 detects that there is the possibility that the host vehicle is going to enter the parking lot. Then, the procedure proceeds S3. When it is determined that the average tire wheel speed value V does not fall below the lower limit $V_L$, corresponding to NO at S2, S2 is repeated.

In the above example of the present embodiment, based on whether or not the average tire wheel speed value V falls below the predetermined lower limit $V_L$, the entry possibility detection section 12 detects whether or not there is a possibility that the host vehicle is going to enter a parking lot. However, this configuration is merely an example and does not limit the present embodiment. For example, when it is detected that the average tire wheel speed value V falls below the predetermined lower limit $V_L$ and when it is further detected that a blinker (turn signal) of the vehicle is operated based on a signal from a blinker switch, the entry possibility detection section 12 may detect that there is a possibility that the host vehicle is going to enter a parking lot.

In the above example, although the average tire wheel speed value V is used in the entry possibility detection process. Alternatively, for example, the tire wheel speed of one tire wheel, which is detected with the tire wheel speed detection section 11 based on only one of the sensor signals of the wheel speed sensors 2a to 2d, may be used in place of the average tire wheel speed value V.

Alternatively, the vehicle speed may be used in place of the average tire wheel speed value V. In other words, not only based on the tire wheel speed but also based on the vehicle speed, it may be determined whether or not there is a possibility that the host vehicle is going to enter a parking lot. When the vehicle speed of the host vehicle is used, the vehicle speed may be detected based on the tire wheel speed detected with the tire wheel speed detection section 11. Alternatively, the vehicle speed may be detected based on a sensor signal of a vehicle speed sensor that detects rotation speed of an output shaft.

In the above example of the present embodiment, the entry possibility detection section 12 of the parking lot entry determination apparatus 1 is configured to detect whether or not there is a possibility that the host vehicle is going to enter a parking lot. The procedure proceeds to S3 if it is determined that there is the possibility that the host vehicle is going to enter a parking lot. Alternatively, for example, the parking lot entry determination apparatus 1 may be configured as follows. The entry possibility detection section 12 may estimate whether or not the host vehicle is running outside the parking lot. The procedure proceeds to S3 if the entry possibility detection section 12 estimates that the host vehicle is running outside the parking lot. In this case, the entry possibility detection section 12 can correspond to a parking lot outside run estimation means or section. For example, the entry possibility detection section 12 may estimate whether or not the host vehicle is running outside the parking lot, based on whether or not the tire wheel speed or the vehicle speed is a certain threshold or more. The certain threshold may be arbitrary constant value.

At S3, based on the sensor signal of the steering angle sensor 3, the turn state detection section 13 detects the steering angle θ of the steering wheel of the host vehicle as information on a turn direction and a degree of turn of the host vehicle. Furthermore, at S3, the turn state detection section 13 determines whether or not the steering angle θ is larger than a threshold $θ_L$ on an anticlockwise side of the neutral position. When the steering angle θ is larger than the threshold $θ_L$, corresponding to YES at S3, the procedure proceeds to S5. In this case, it is determined that the host vehicle turns left. The turn state detection section 13 can correspond to a turn state detection means. When the steering angle θ is not larger than the threshold $θ_L$, corresponding to NO at S3, the procedure proceeds to S4. In the above, the threshold $θ_L$ of the steering angle θ is arbitrarily settable to correspond to approximately the least amount of anticlockwise operation of the steering wheel from the neutral position when the vehicle turns left.

At S4, the turn state detection section 13 determines whether or not the steering angle θ is smaller than a threshold $θ_R$ on a clockwise side of the neutral position. When the steering angle θ is smaller than the threshold $θ_R$, corresponding to YES at S4, the procedure proceeds to S6. In this case, it is determined that the host vehicle turns right. When the steering angle θ is not smaller than the threshold $θ_R$, corresponding to NO at S4, the procedure returns to S4. In the above, the threshold $θ_R$ of the steering angle θ is arbitrarily settable to correspond to approximately the least amount of clockwise operation on the steering wheel from the neutral position when the host vehicle turns right.

Figure 4:
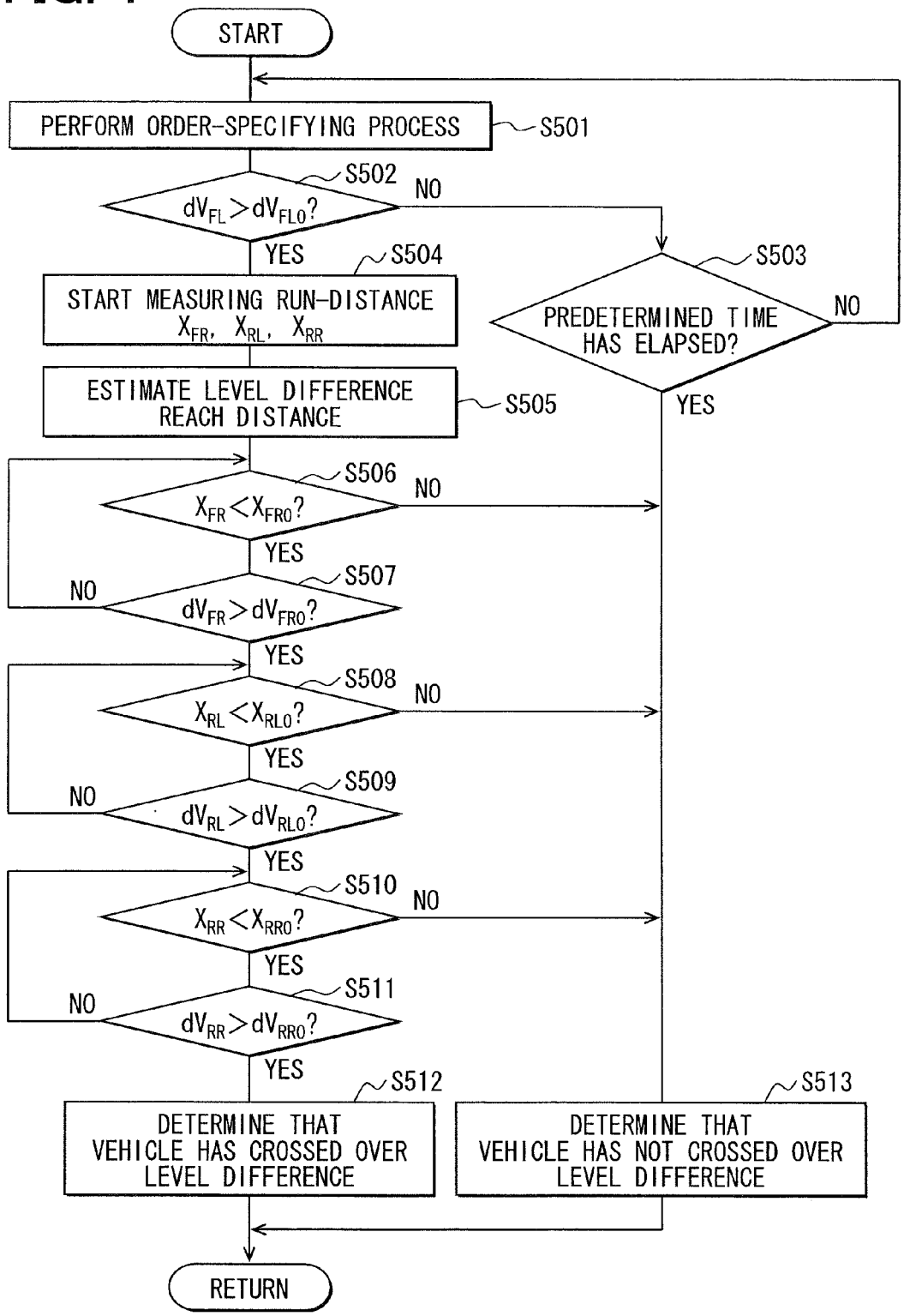
FIG. 4 is a flowchart illustrating an operation procedure of a level difference determination process for left-turn.

At S5, a level difference determination process for left turn is performed, and then the process proceeds S7. Now, the level difference determination process for left turn will be described with reference to FIG. 4. FIG. 4 is a flowchart illustrating one example of an operation procedure of the level difference determination process for left turn.

At S501, the order specifying section 14 performs an order specifying process. After S501, the procedure proceeds to S502. In the order specifying process, the order specifying section 14 specifies a tire wheel crossing order. The tire wheel crossing order is an order in which the tire wheels of the host vehicle cross over the level difference existing between the parking lot and the road when the host vehicle crosses over the level difference. The tire wheel crossing order is specified in accordance with the turn direction of the host vehicle. Since the turn direction of the host vehicle is a left direction at S501, the specified tire wheel crossing order is the front left tire wheel, the front right tire wheel, the rear left tire wheel, and the rear right tire wheel. In the order specifying process, the tire wheel placed first in the wheel crossing order is determined as a starting-point tire wheel, which is the front left tire wheel in this case. The order specifying section 14 corresponds to an order specifying section or means, and a starting-point determination section or means.

At S502, the tire wheel speed detection section 11 detects the tire wheel speed of the front left tire wheel, which is determined as the starting-point tire wheel at S501. In addition, the tire wheel speed differentiation value calculation section 15 calculates the differential value $dV_{FL}$ of the detected tire wheel speed of the front left tire wheel. Then, the threshold determination section 16 determines whether or not the differential value $dV_{FL}$ exceeds a predetermined threshold $dV_{FL0}$. The tire wheel speed differential value calculation section can correspond to a tire wheel speed change amount calculation means or section. The threshold determination section 16 can correspond to a threshold determination means.

In the above, the threshold $dV_{FL0}$ is arbitrary settable so that the threshold $dV_{FL0}$ is smaller than a first given value but larger than a second given value. The first given value is a differential value of tire wheel speed of the front left tire wheel when the front left tire wheel crosses over the level difference existing between the parking lot and the street. The second given value is a differential value of the tire wheel speed when the front left tire wheel crosses over the concavity and convexity or pebbles on a road surface of the road. The below-described thresholds $dV_{FR0}$, $dV_{RL0}$, $dV_{RR0}$ can be set in the same way as the threshold $dV_{FL0}$. The thresholds $dV_{FL0}$, $dV_{FR0}$, $dV_{RL0}$, $dV_{RR0}$ may have the same value, or may have different values according to their tire wheels.

When it is determined that the differential value $dV_{FL}$ is larger than the threshold $dV_{FL0}$, corresponding to YES at S502, the procedure proceeds to S504. When it is determined that the differential value $dV_{FL}$ is not larger than the threshold $dV_{FL0}$, corresponding to NO at S502, the procedure proceeds to S503.

At S503, it is determined whether or not an elapsed time from the start of the level difference determination process for left turn reaches a predetermined time. When it is determined that the elapsed time reaches the predetermined time, corresponding to YES at S503, the procedure proceeds to S513. When it is determined that the elapsed time does not reach the predetermined time, corresponding to YES at S503, the procedure returns to S502. The elapsed time from the start of the level difference determination process for left turn may be counted with use of a timer circuit (not shown) or the like.

At S504, the running distance measurement section 17 starts measuring a running distance of each non-starting-point tire wheel, and the procedure proceeds to S505. The non-starting-point tire wheels are the tire wheels other than the starting-point tire wheel. In this example, the non-starting-point tire wheels are the front right tire wheel, the rear left tire wheel, and the rear right tire wheel. The running distance measurement section 17 can correspond to a running distance measurement means. The running distance measurement section 17 may measure the running distance of each non-starting-point tire wheel by calculating a value of integral of the tire wheel speed of each non-starting-point tire wheel detected with the tire wheel speed detection section 11. In the following, the running distance of the front right tire wheel is denoted by $X_{FR}$. The running distance of the rear left tire wheel is denoted by $X_{RL}$. The running distance of the rear right tire wheel is denoted by $X_{RR}$.

At S505, the level difference reach distance estimation section 18 performs a level difference reach distance estimation process. After S506, the procedure proceeds to S506. In the level difference reach distance estimation processes, a certain running distance (also called a level difference reach distance) of each non-starting point tire wheel is estimated based on (i) a positional relation of the each non-starting-point tire wheel with the starting-point tire wheel and (ii) the steering angle θ detected with the turn state detection section 13 (specifically, a steered angle of the tire wheel corresponding to the detected steering angle θ). The certain running distance to be estimated (i.e., the level difference reach distance) is the running distance of the non-starting-point tire wheel from a first time to a second time. The first time is a time when the threshold determination section 16 determines that the differential value of the tire wheel speed of the starting point tire wheel exceeds the threshold. The second time is a time when the non-starting tire wheel crosses over the level difference. The estimation of the level difference reach distance is made on assumption that the starting-point tire wheel crosses over the level difference at a time when the threshold determination section 16 determines that the differential value of the tire wheel speed of the starting point tire wheel exceeds the threshold. The level difference reach distance estimation section 18 can correspond to a level difference reach distance estimation means.

For example, the level difference reach distance $X_{FR0}$ of the front right tire wheel is estimated based on an axle track of the host vehicle and the steering angle θ. The level difference reach distance $X_{RL0}$ of the rear left tire wheel is estimated based on a wheelbase of the host vehicle and the steering angle θ. The level difference reach distance $X_{RR0}$ of the rear right tire wheel is estimated based on the axle track and wheelbase of the host vehicle and the steering angle θ.

At S506, the level difference crossing determination section 19 determines whether or not the running distance $X_{FR}$ of the front right tire wheel, which is next to the front left tire wheel in the tire wheel crossing order, is smaller than the level difference reach distance $X_{FR0}$. When it is determined that the running distance $X_{FR}$ is smaller than the level difference reach distance $X_{FR0}$, corresponding to YES at S506, the procedure proceeds to S507. When it is determined that the running distance $X_{FR}$ is not smaller than the level difference reach distance $X_{FR0}$, corresponding to NO at S506, the procedure proceeds to S513.

At S507, the tire wheel speed differential value calculation section 15 calculates the differential value $dV_{FR}$ of the tire wheel speed, which is detected with the tire wheel speed detection section 11, of the front right tire wheel. In addition, the threshold determination section 16 determines whether or not the differential value $dV_{FR}$ is larger than a predetermined threshold $dV_{FR0}$. When it is determined that the differential value $dV_{FR}$ is larger than the predetermined threshold $dV_{FR0}$, corresponding to YES at S507, the procedure proceeds to S508. When it is determined that the differential value $dV_{FR}$ is not larger than the predetermined threshold $dV_{FR0}$, corresponding to NO at S507, the procedure returns to S506.

At S508, in accordance with the tire wheel crossing order specified at the order specifying process, the level difference crossing determination section 19 determines whether or not the running distance $X_{RL}$ of the rear left tire wheel, which is next to the front right tire wheel in the tire wheel crossing order, is smaller than the level difference reach distance $X_{RL0}$. When it is determined that the running distance $X_{RL}$ is smaller than the level difference reach distance $X_{RL0}$, corresponding to YES at S508, the procedure proceeds to S509. When it is determined that the running distance $X_{RL}$ is not smaller than the level difference reach distance $X_{RL0}$, corresponding to NO at 5508, the procedure proceeds to S513.

At S509, the tire wheel speed differential value calculation section 15 calculates the differential value $dV_{RL}$ of the tire wheel speed, which is detected with the tire wheel speed detection section 11, of the rear left tire wheel. In addition, the threshold determination section 16 determines whether or not the differential value $dV_{RL}$ is larger than the predetermined threshold $dV_{RL}$. When it is determined that the differential value $dV_{RL}$ is larger than the predetermined threshold $dV_{RL0}$, corresponding to YES at S509, the procedure proceeds to S510. When it is determined that the differential value $dV_{RL}$ is not larger than the predetermined threshold $dV_{RL0}$, corresponding to NO at S509, the procedure returns to S508.

At S510, in accordance with the tire wheel crossing order specified at the order specifying process, the level difference crossing determination section 19 determines whether or not the running distance $X_{RR}$ of the rear right tire wheel, which is next to the rear left tire wheel in the tire wheel crossing order, is smaller than the level difference reach distance $X_{RR0}$. When it is determined that the running distance $X_{RR}$ is smaller than the level difference reach distance $X_{RR0}$, corresponding to YES at S510, the procedure proceeds to S511. When it is determined that the running distance $X_{RR}$ is not smaller than the level difference reach distance $X_{RR0}$, corresponding to NO at S510, the procedure proceeds to S513.

At S511, the tire wheel speed differential value calculation section 15 calculates the differential value $dV_{RR}$ of the tire wheel speed, which is detected with the tire wheel speed detection section 11, of the rear right tire wheel. In addition, the threshold determination section 16 determines whether or not the differential value $dV_{RR}$ is larger than a predetermined threshold $dV_{RR0}$. When it is determined that the differential value $dV_{RR}$ is larger than the predetermined threshold $dV_{RR0}$, corresponding to YES at S511, the procedure proceeds to S512. When it is determined that the differential value $dV_{RR}$ is not larger than the predetermined threshold $dV_{RR0}$, corresponding to NO at S509, the procedure returns to S510.

At S512, the level difference crossing determination section 19 determines that the host vehicle has crossed over the level difference existing between the parking lot and the road. Then, the procedure proceeds to S7. At S513, the level difference crossing determination section 19 determines that the host vehicle has not crossed over the level difference existing between the parking lot and the road. Then, the procedure proceeds to S7. The level difference crossing determination section 19 can correspond to a level difference crossing determination section or means.

Figure 5:
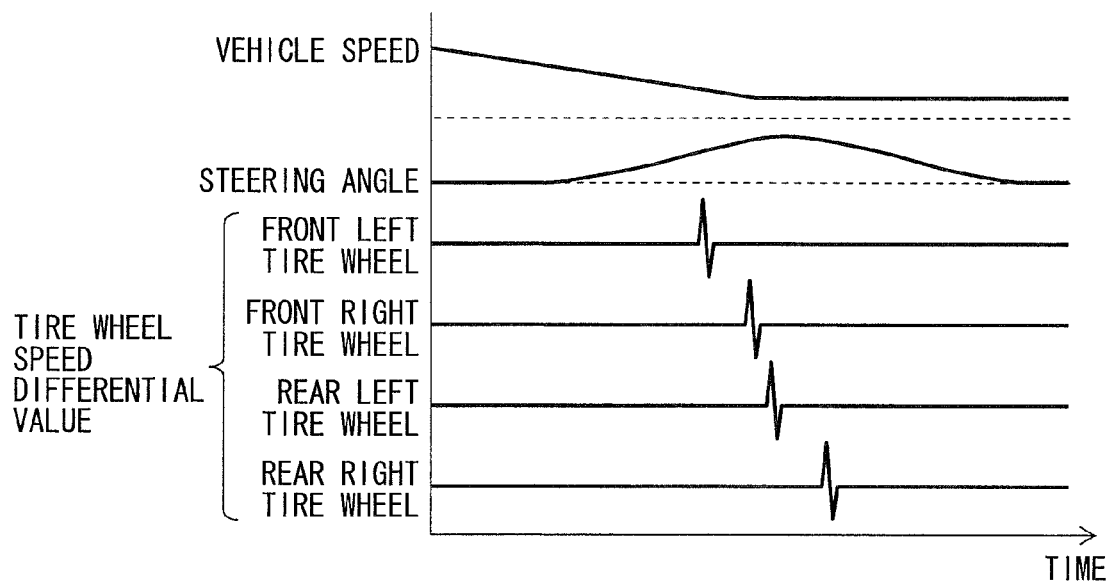
FIG. 5 is a diagram illustrating time waveforms of various signals when a vehicle enters a parking lot by, while turning left, crossing over a level difference existing between the parking lot and a road.

Next, with reference to FIG. 5, explanation is given on timing of changing the tire wheel speed of each tire wheel when the host vehicle enters a parking lot by crossing over a level difference between the parking lot and a road while turning left. FIG. 5 is a diagram showing one example of time waveforms of various signals when the host vehicle enters a parking lot by crossing over a level difference between the parking lot and a road while turning left. FIG. 5 shows the time waveforms of the signals of the vehicle speed, the steering angle θ, the differential value $dV_{FL}$ of the tire wheel speed of the front left tire wheel, the differential value $dV_{FR}$ of the tire wheel speed of the front right tire wheel, the differential value $dV_{RL}$ of the tire wheel speed of the rear left tire wheel, and the differential value $dV_{RR}$ of the tire wheel speed of the rear right tire wheel.

At a time when a tire wheel crosses over the level difference, its tire wheel speed changes. Thus, when the host vehicle crosses over the level difference, the changes in the tire wheel speed of the respective tire wheels take place in order. For example, when the host vehicle crosses over the level difference while turning left, the changes in the tire wheel speed of the respective tire wheels take place in the following order: the front left tire wheel; the front right tire wheel; the rear left tire wheel; and the rear right tire wheel. Therefore, when the host vehicle crosses over the level difference while turning left, the differential values of the tire wheel speed of the respective tire wheels show a peak in the following order: the front left tire wheel; the front right tire wheel; the rear left tire wheel; and the rear right tire wheel.

The parking lot entry determination apparatus 1 determines whether or not the host vehicle has crossed over the level difference, based on whether or not a threshold-exceeding order is identical to the tire wheel crossing order specified at the order specifying process. In the above, the threshold-exceeding order is an order in which the threshold determination section 16 determines that the differential values of the vehicle speed of all the four tire wheels exceed the threshold. Therefore, it is possible to highly accurately determine the entry of the host vehicle into the parking lot.

Figure 6:
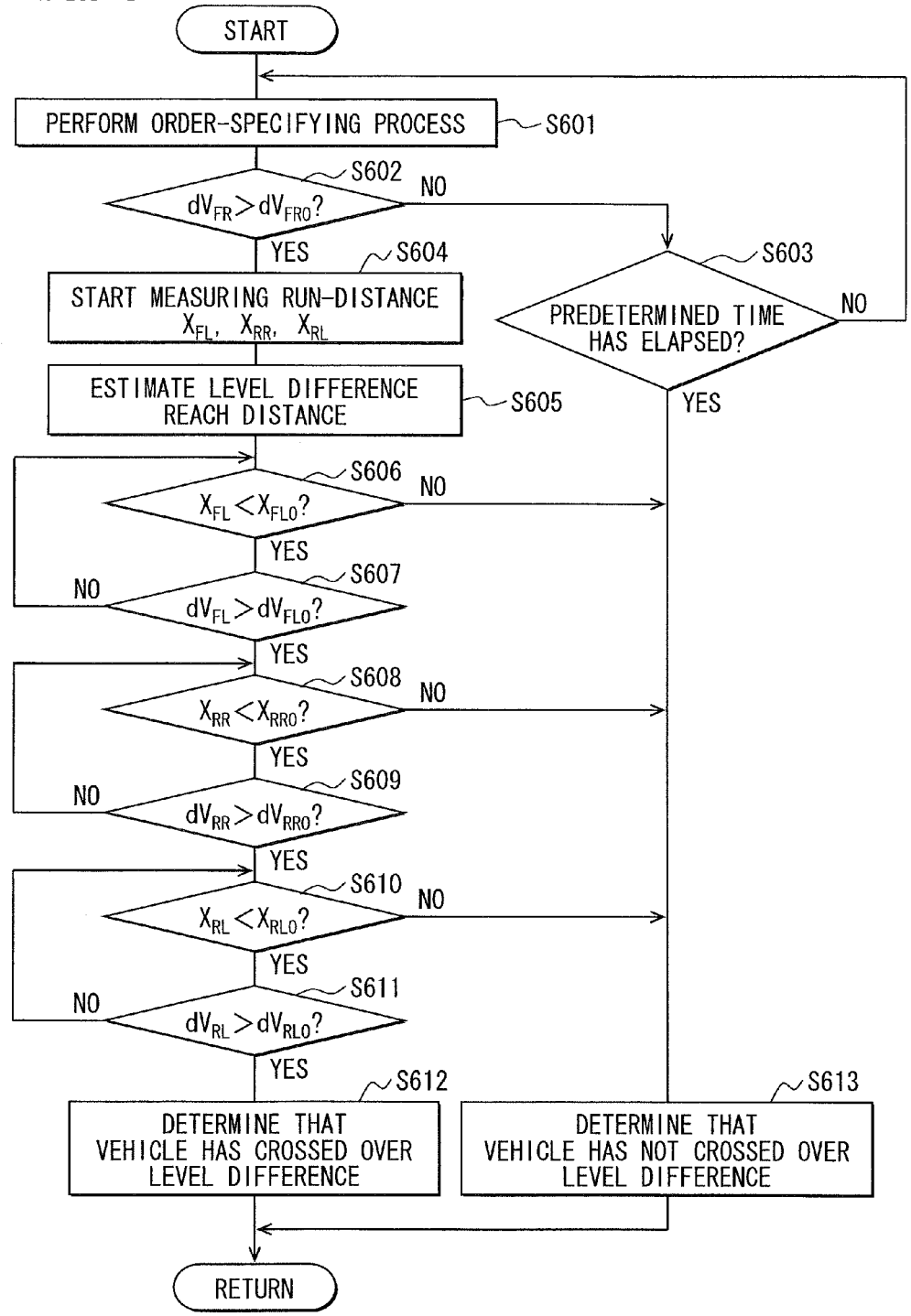
FIG. 6 is a flowchart illustrating an operation procedure of a level difference determination process for right-turn.

Explanation returns to FIG. 3. At S6, the level difference determination process for right is performed. After S6, the procedure proceeds to S7. Now, the level difference determination process for right turn will be described with reference to FIG. 6. FIG. 6 is a flowchart illustrating one example of an operation procedure of the level difference determination process for right turn.

At S601, the order specifying section 14 performs the order specifying process. After S601, the procedure proceeds to S602. Since the turn direction of the host vehicle is a right direction at S601, the specified tire wheel crossing order is as follows: the front right tire wheel, the front left tire wheel, the rear right tire wheel, and the rear left tire wheel. In the order specifying process, the tire wheel placed first in the tire wheel crossing order is determined as the starting-point tire wheel, which is the front right tire wheel in the this case.

At S602, the tire wheel speed detection section 11 detects the tire wheel speed of the front right tire wheel, which is determined as the starting-point tire wheel at S601. In addition, the tire wheel speed differentiation value calculation section 15 calculates the differential value $dV_{FR}$ of the detected tire wheel speed of the front right tire wheel. Then, the threshold determination section 16 determines whether or not the differential value $dV_{FR}$ exceeds a predetermined threshold $dV_{FR0}$. When it is determined that the differential value $dV_{FR}$ is larger than the predetermined threshold $dV_{FR0}$, corresponding to YES at S602, the procedure proceeds to S604. When it is determined that the differential value $dV_{FR}$ is not larger than the threshold $dV_{FR0}$, corresponding to NO at S602, the procedure proceeds to S603.

At S603, it is determined whether or not an elapsed time from the start of the level difference determination process for right turn reaches a predetermined time. When it is determined that the elapsed time reaches the predetermined time, corresponding to YES at S603, the process proceeds to S613. When it is determined that the elapsed time does not reach the predetermined time, corresponding to YES at S603, the process returns to S602. The elapsed time from the start of the level difference determination process for right turn may be counted with use of a timer circuit (not shown) or the like.

At S604, the running distance measurement section 17 starts measuring a running distance of each non-starting point tire wheel, and the procedure proceeds to S605. The non-starting-point tire wheels are the tire wheels other than the starting-point tire wheel. In this example, the non-starting-point tire wheels are the front left tire wheel, the rear right tire wheel, and the rear left tire wheel. At S605, the level difference reach distance estimation section 18 performs the level difference distance estimation process, and the procedure proceeds to S606.

For example, the level difference reach distance $X_{FL0}$ of the front left tire wheel is estimated based on the axle track of the host vehicle and the steering angle θ. The level difference reach distance $X_{RL0}$ of the rear right tire wheel is estimated based on a wheelbase of the host vehicle and the steering angle θ. The level difference reach distance $X_{RR0}$ of the rear left tire wheel is estimated based on the axle track and wheelbase of the host vehicle and the steering angle θ.

At S606, in accordance with the tire wheel crossing order specified at the order specifying process, the level difference crossing determination section 19 determines whether or not the running distance $X_{FL}$ of the front left tire wheel, which is next to the front right tire wheel in the tire wheel crossing order, is smaller than the level difference reach distance $X_{FL0}$. When it is determined that the running distance $X_{FL}$ is smaller than the level difference reach distance $X_{FL0}$, corresponding to YES at S606, the procedure proceeds to S607. When it is determined that the running distance $X_{FL}$ is not smaller than the level difference reach distance $X_{FL0}$, corresponding to NO at S606, the procedure proceeds to S613.

At S607, the tire wheel speed differential value calculation section 15 calculates the differential value $dV_{FL}$ of the tire wheel speed, which is detected with the tire wheel speed detection section 11, of the front left tire wheel. In addition, the threshold determination section 16 determines whether or not the differential value $dV_{FL}$ is larger than the predetermined threshold $dV_{FL0}$. When it is determined that the differential value $dV_{FL}$ is larger than the threshold $dV_{FL0}$, corresponding to YES at S607, the process proceeds to S608. When it is determined that the differential value $dV_{FL}$ is not larger than the predetermined threshold $dV_{FL0}$, corresponding to NO at S607, the procedure returns to S606.

At S608, in accordance with the tire wheel crossing order specified at the order specifying process, the level difference crossing determination section 19 determines whether or not the running distance $X_{RR}$ of the rear right tire wheel, which is next to the front left tire wheel in the tire wheel crossing order, is smaller than the level difference reach distance $X_{RR0}$. When it is determined that the running distance $X_{RR}$ is smaller than the level difference reach distance $X_{RR0}$, corresponding to YES at S608, the procedure proceeds to S609. When it is determined that the running distance $X_{RR}$ is not smaller than the level difference reach distance $X_{RR0}$, corresponding to NO at S608, the procedure proceeds to S613.

At S609, the tire wheel speed differential value calculation section 15 calculates the differential value $dV_{RR}$ of the tire wheel speed, which is detected with the tire wheel speed detection section 11, of the rear right tire wheel. In addition, the threshold determination section 16 determines whether or not the differential value $dV_{RR}$ is larger than the predetermined threshold $dV_{RR0}$. When it is determined that the differential value $dV_{RR}$ is larger than the predetermined threshold $dV_{RR0}$, corresponding to YES at S609, the procedure proceeds to S610. When it is determined that the differential value $dV_{RR}$ is not larger than the predetermined threshold $dV_{RR0}$, corresponding to NO at S609, the procedure returns to S608.

At S610, in accordance with the tire wheel crossing order specified at the order specifying process, the level difference crossing determination section 19 determines whether or not the running distance $X_{RL}$ of the rear left tire wheel, which is next to the rear right tire wheel in the tire wheel get crossing order, is smaller than the level difference reach distance $X_{RL0}$. When it is determined that the running distance $X_{RL}$ is smaller than the level difference reach distance $X_{RL0}$, corresponding to YES at S610, the procedure proceeds to S611. When it is determined that the running distance $X_{RL}$ is not smaller than the level difference reach distance $X_{RL0}$, corresponding to NO at S610, the procedure proceeds to S613.

At S611, the tire wheel speed differential value calculation section 15 calculates the differential value $dV_{RL}$ of the tire wheel speed, which is detected with the tire wheel speed detection section 11, of the rear left tire wheel. In addition, the threshold determination section 16 determines whether or not the differential value $dV_{RL}$ is larger than the predetermined threshold $dV_{RL0}$. When it is determined that the differential value $dV_{RL}$ is larger than the threshold $dV_{RL0}$, corresponding to YES at 5611, the procedure proceeds to S612. When it is determined that the differential value $dV_{RL}$ is not larger than the predetermined threshold $dV_{RL0}$, corresponding to NO at S611, the procedure returns to S610.

At S612, the level difference crossing determination section 19 determines that the host vehicle has crossed over the level difference existing between the parking lot and the road. Then, the procedure proceeds to S7.

At 5613, the level difference crossing determination section 19 determines that the host vehicle has not crossed over the level difference existing between the parking lot and the road. Then, the procedure proceeds to S7.

Explanation returns to FIG. 3. When the level difference crossing determination section 19 determines at S7 that the host vehicle has crossed over the level difference, corresponding to YES at S7, it is determined that the host vehicle has entered the parking lot, and the procedure proceeds to S8. When the level difference crossing determination section 19 determines that the host vehicle has not crossed over the level difference, corresponding to NO at S7, it is determined that the host vehicle has not entered the parking lot, and the procedure returns to S2.

At S8, the braking force driving force control section 20 performs a sudden acceleration suppression process. After S8, the procedure proceeds to S9. For example, in the sudden acceleration suppression process, the braking force driving force control section 20 controls the engine ECU 4 by commanding the engine ECU 4 to perform such engine control that prevents engine torque from exceeding a certain value, so that acceleration of the host vehicle is suppressed. The braking force driving force control section 20 can correspond to a sudden acceleration suppression section or means. The engine ECU4 may reduce an amount of fuel injection to prevent the engine torque from exceeding the certain value. In the above, the certain value may be an arbitrarily settable value, and may be set to an engine torque value at a time when the vehicle travels under a "slow" traffic sign. According to the above manner, when the host vehicle enters the parking lot, the sudden acceleration of the host vehicle can be prevented, and driving safety in the parking lot can be increased.

At S9, the pedal improper operation detection section 21 performs a pedal improper operation detection process. For example, in the pedal improper operation detection process, based on a sensor signal of an accelerator operation sensor (not shown), an improper operation of an accelerator pedal is detected. For example, the improper operation of the accelerator pedal to be detected may include the following. A pressing down amount of the accelerator pedal or a rate of change in pressing down amount of the accelerator pedal is larger than a certain amount. The certain amount may be an arbitrarily-settable value, and may be set to approximately a value at which departure from a parking lot normal occurs. The parking lot normal travel may correspond to a situation where the vehicle normally travels in a parking lot with a normal pressing down amount or a normal rate of change in pressing down amount.

When the improper operation of the accelerator pedal is detected, corresponding to YES at S9, the procedure proceeds to S10. When the improper operation of the accelerator pedal is not detected, corresponding to NO at S9, the procedure proceeds to S11.

At S10, the braking force driving force control section 20 performs a braking force increase process. After S10, the procedure proceeds to S11. In the braking force increase process, for example, the braking force driving force control section 20 controls the brake ECU 5 by commanding the brake ECU 5 to perform such brake control that increases a brake fluid pressure, thereby increasing the braking force of the host vehicle. The braking force driving force control section 20 corresponds to a braking force control section or means. According to the above manner, when the host vehicle enters the parking lot and then the improper operation of the accelerator pedal is conducted, it becomes possible to facilitate stopping the vehicle or forcibly stop the vehicle by not only preventing the sudden acceleration of the host vehicle but also increasing the braking force. It is possible to further enhance safety in driving a parking lot.

At S11, it is determined whether or not the IG switch of the host vehicle is turned off. When the IG switch of the host vehicle is turned off, corresponding to YES at S11, the procedure is ended. When it is determined that the IG switch of the host vehicle is not turned off, corresponding to NO at S11, the procedure returns to S9.

According to the above configuration, in order to determine whether not the vehicle has crossed over the level difference, the parking lot entry determination apparatus 1 does not detect the vertical direction acceleration associated with the up and down movement of the host vehicle and does not use the map matching data or map data of an in-vehicle navigation apparatus. Instead, the parking lot entry determination apparatus 1 detects the tire wheel speeds of the host vehicle in order to determine whether not the vehicle has crossed over the level difference. A wheel speed sensor, which is generally mounted to a vehicle equipped with an antilock brake system (ABS) or the like, is pre-installed in a vehicle at a higher rate than the acceleration sensor used for detecting the vertical direction acceleration and the in-vehicle navigation apparatus are pre-installed in the vehicle. Therefore, in many cases, the present embodiment does not require additional installation of the wheel speed sensor into a vehicle. Therefore, the present can achieve cost reduction as compared with cases where the in-vehicle navigation apparatus or the acceleration sensor for detecting the vertical direction acceleration is to be installed.

Let us consider a comparison example in which: based on the vertical direction acceleration, it is determined whether or not the host vehicle has crossed over a level difference existing between the parking lot and the road. In this comparison example, for example, there is a high possibility that when the tire wheel crosses over an unevenness of a part of a road surface or a pebble, it is erroneously determined that the host vehicle has crossed over the level difference. According to the present embodiment, by contrast, even if some of the tire wheels cross over an unevenness of a part of a road surface or a pebble, changes in tire wheel speed of all of the tire wheels are not detected although a change in tire wheel speed of some of the tire wheels may be detected. Thus, an erroneous determination that the host vehicle has crossed over the level difference does not occur. This is because the vehicle has a difference between track followed by front and back inner wheels when turning and a difference between track followed by front and back outer wheels when turning.

Moreover, according to the above configuration of the present embodiment, it is determined whether or not the host vehicle has crossed over the level difference, not only based on a result of a first determination but also a result of second determination. The first determination is a determination of whether or not the differential values of the tire wheel speed of the respective tire wheels exceed the threshold in an order identical to the tire wheel crossing order specified at the order specifying process. The second determination is a determination of whether or not the differential value of the tire wheel speed of each non-starting point time wheel exceeds the threshold by a time when the running distance of the each non-starting point tire wheel exceeds the level difference reach distance of the each non-starting point tire wheel estimated at the level difference distance estimation process. Therefore, it is possible to highly accurately determine whether or not the host vehicle has crossed over the level difference, and it is possible to highly accurately determine the entry of the host vehicle into the parking lot. In the above, the first determination and the second determination are made by the threshold determination section 16.

Alternatively, it may be determined whether or not the host vehicle has crossed over the level difference by performing the first determination without performing the second determination. In this configuration, out of the turn direction and the degree of turn of the host vehicle, the information on the degree of turn is not needed. Thus, the turn state detection section 13 may be configured such that: for example, based on a sensor signal of the blinker switch for left and right blinkers, the turn state detection section 13 detects the turn direction of the host vehicle by determining which of the left blinker and the right blinker a conducted blinker operation is directed to.

In the above example of the present embodiment, the parking lot entry determination apparatus 1 is configured to determine the entry of the host vehicle into the parking lot. The parking lot entry determination apparatus 1 may be configured to further determine exit of the host vehicle from the parking lot. In this case, for example, when the parking lot entry determination apparatus 1 determines that the host vehicle has crossed over the level difference after the host vehicle had entered the parking lot, the parking lot entry determination apparatus 1 may determine that the host vehicle has exited the parking lot.

For example, when the IG switch is turned on after the IG switch is turned off at S11, processes similar to the processes S2 to S7 are performed. When it is determined that the vehicle has crossed over the level difference, it is determined that the vehicle has exited the parking lot. In this case, by a time when it is determined that the vehicle exits the parking lot, processes similar to S8 to S10 continue to be performed, so that the sudden acceleration is suppressed or the braking force is increased at a time of the improper operation of the acceleration pedal. After it is determined that the host vehicle exits the parking lot, the suppression of the acceleration of the host vehicle by the sudden acceleration suppression process is stopped, and the increase in braking force of the host vehicle by the braking force increase process is stopped.

Figure 7:
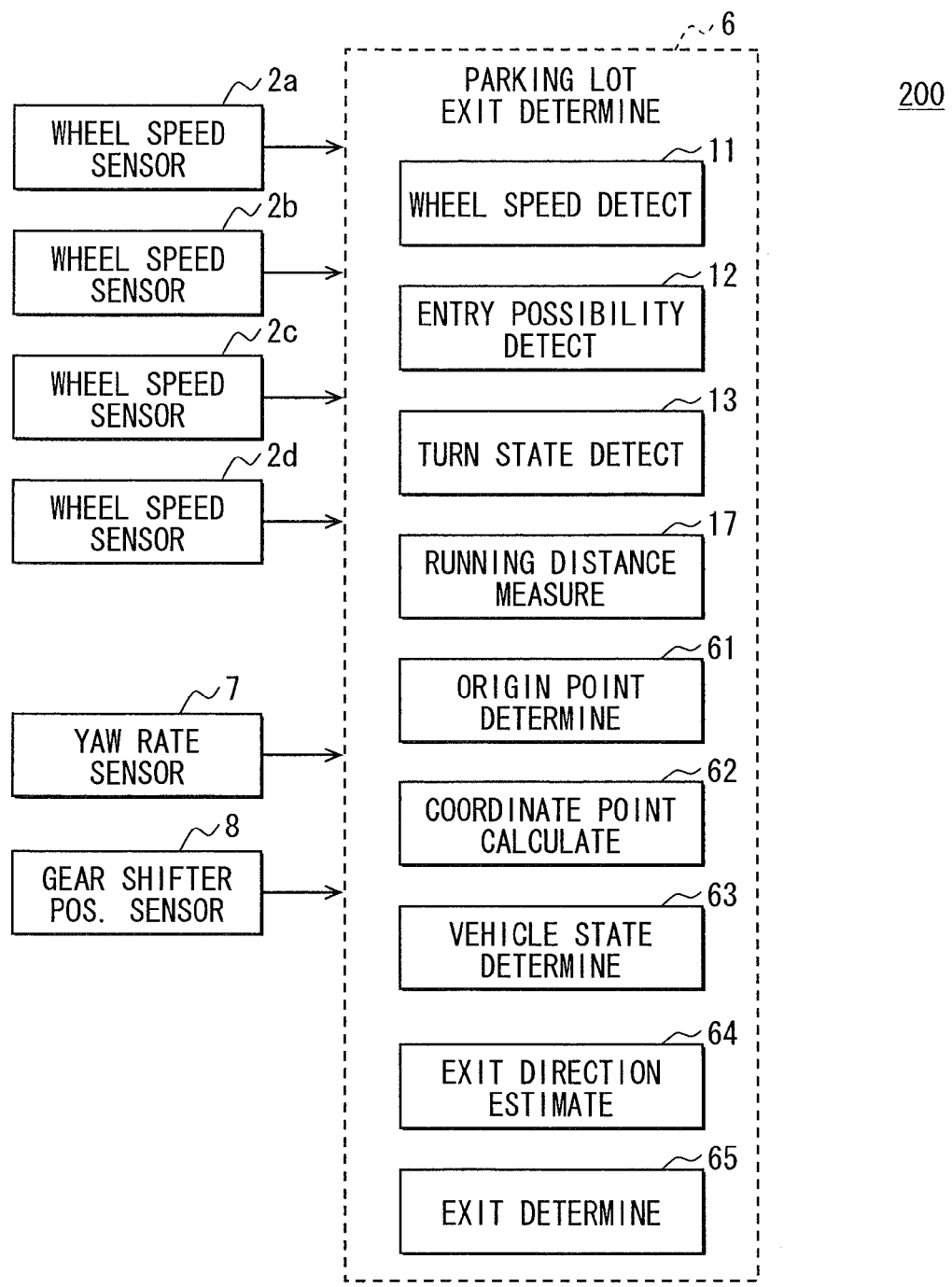
FIG. 7 is a diagram illustrating another example of a driving assistance system.

In the above example, although the parking lot entry determination apparatus makes also the determination as to the exit of the host vehicle from the parking lot, the determination as to the exit of the host vehicle from the parking lot may be made in an apparatus other than the parking lot entry determination apparatus 1. In the following, a parking lot exit determination apparatus 6 for making a determination as to the exit of the host vehicle from the parking lot will be described with reference to the drawings. FIG. 7 is a diagram illustrating a schematic configuration of a driving assistance system 200.

The driving assistance system 200 is mounted to a vehicle, and includes a parking lot exit determination apparatus 6 (also called a driving assistance apparatus), wheel speed sensors 2a to 2d, a yaw rate sensor 7, and a gear shifter position sensor 8. For illustrative purpose, like numeral references are used to refer to like parts or steps between the foregoing description and the following description. Explanation on like parts or steps may be omitted in the following.

The yaw rate sensor 7 measures a yaw rate Mz of the host vehicle (i.e., a rate of change in rotation angle of the host vehicle in a turn direction). The yaw rate is positive when the turn direction is a left direction. The yaw rate is negative when the turn direction is a right direction.

The gear shifter position sensor 8 detects position of the gear shifter of the host vehicle. In the following example of the present embodiment, the driving assistance system 200 is applied to a vehicle having automatic transmission (AT). The positions of the gear shifter include, for example, a parking position P, a reverse position R, a neutral position N, and a driving position D.

The parking lot exit determination apparatus 6 includes a microcomputer with a CPU, a ROM, a RAM, a backup RAM and the like. Based on inputted information, the parking lot exit determination apparatus 6 executes various control programs stored in the ROM, thereby performing various processes. As shown in FIG. 6, as functional blocks, the parking lot exit determination apparatus 6 includes a tire wheel speed detection section 11, an entry possibility detection section 12, a turn state detection section 13, a running distance measurement section 17, an origin point determination section 61, a coordinate point calculation section 62, a vehicle state determination section 63, an exit direction estimation section 64, and an exit determination section 65. The parking lot entry determination apparatus 1 and the parking lot exit determination apparatus 6 may be configured as a single electronic control unit (ECU).

Figure 8:
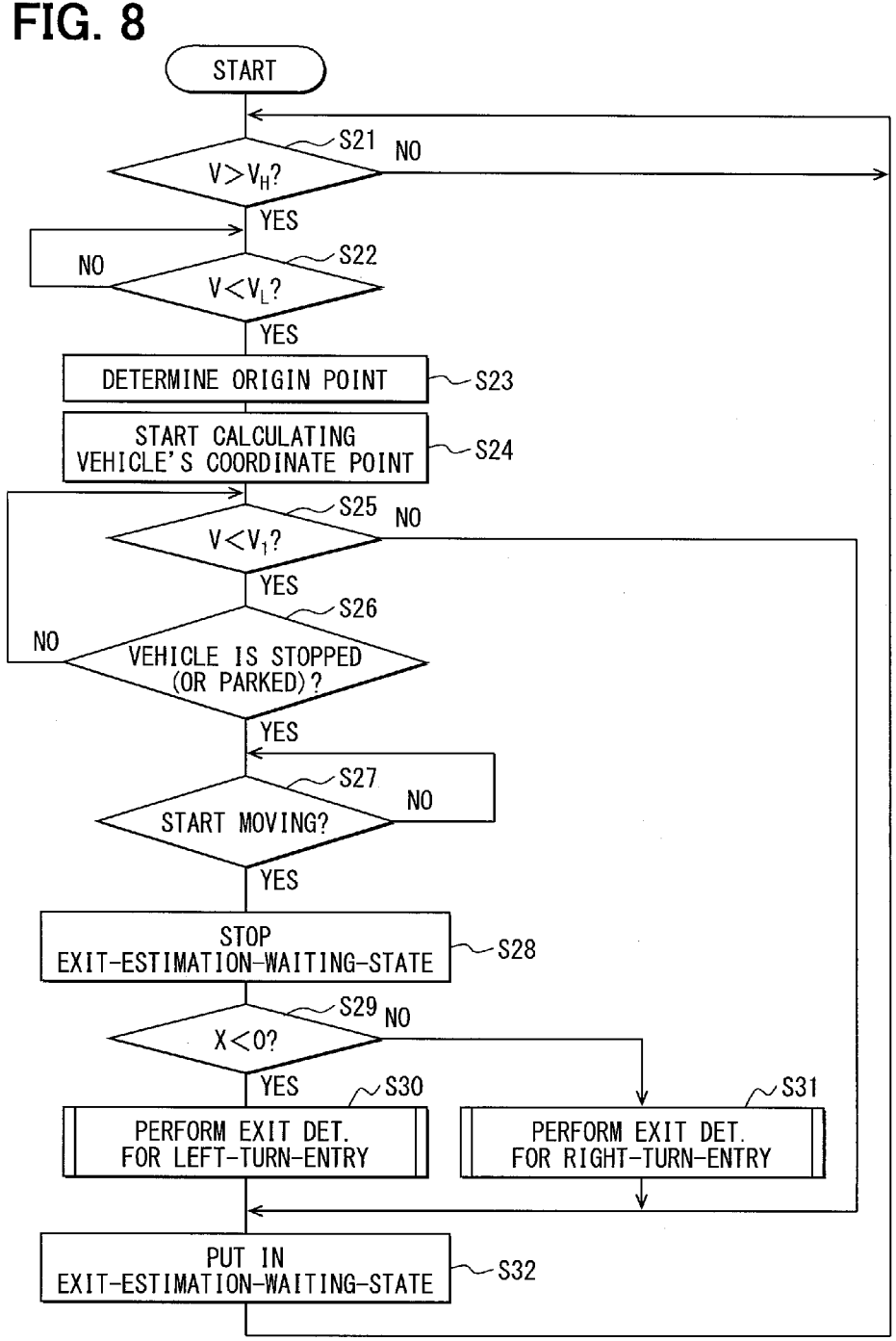
FIG. 8 is a flowchart illustrating an operation procedure of a parking lot exit determination apparatus.

Next, with reference to FIG. 8, an operation procedure of the parking lot exit determination apparatus 6 will be described. FIG. 8 is a flowchart illustrating one example of the operation procedure of the parking lot exit determination apparatus 6. When being powered on, the parking lot exit determination apparatus 6 starts the operation procedure. Once the operation flow is started, the below-described processes are repeated. By default, the parking lot exit determination apparatus 6 is in an exit estimation waiting state where an exit determination for left-turn entry and an exit determination for right-turn entry are not started.

At S21, the entry possibility detection section 12 calculates an average value V of the tire wheel speeds of the tire wheels detected with the tire wheel speed detection section 11, and determines whether or not the calculated average tire wheel speed value V exceeds a predetermined upper limit $V_H$ in a manner similar to that at S1. When it is determined that the average tire wheel speed value V exceeds the upper limit $V_H$, corresponding to YES at S21, the process proceeds to S22. When it is determined that the average tire wheel speed value V of the tire wheel speed does not exceed the upper limit $V_H$, corresponding to NO at S21, S21 is repeated.

At S22, the entry possibility detection section 12 performs, in a manner similar to that in S2, an entry possibility detection process to detect whether or not there is a possibility that the host vehicle is going to enter a parking lot. When it is determined that the average tire wheel speed value V falls below the lower limit $V_L$, corresponding to YES at S22, the entry possibility detection section 12 detects that there is the possibility that the host vehicle is going to enter the parking lot. Then, the process proceeds S23. When it is determined that the average tire wheel speed value V does not fall below the lower limit corresponding to NO at S22, S22 is repeated.

As described above, for example, when it is detected that the average tire wheel speed value V falls below the predetermined lower limit $V_L$ and when it is further detected that a blinker (turn signal) of the vehicle is operated based on a signal from a blinker switch, the entry possibility detection section 12 may detect that there is the possibility that the host vehicle is going to enter a parking lot.

At S23, the origin point determination section 61 performs the origin point determination process to determine a point of origin (0,0) of an absolute coordinate system. A point determined as the point of origin is a point at which the possibility that the vehicle is going to enter the parking lot is detected. The origin point determination section 61 can correspond to an origin point determination means. The absolute coordinate system is a two-dimensional coordinate system having an X axis in the vehicle width direction and a Y axis in the vehicle longitudinal direction (vehicle front rear direction). The point of origin of the absolute coordinate system may be set to any point within a horizontal area occupied by the host vehicle at a time when the possibility that the host vehicle is going to enter the parking lot is detected. For example, the point of origin of the absolute coordinate system may be set to a center of gravity of the vehicle at the time when the possibility is detected.

At S24, the coordinate point calculation section 62 starts calculating a coordinate point (x,y) of the host vehicle in the absolute coordinate system with the origin point determined at S23, and the procedure proceeds to S25. An x-coordinate value of the coordinate point indicates a lateral displacement of the host vehicle from the origin point. The positive x-coordinate value and the negative x-coordinate value, respectively, correspond to the left direction and the right direction of the host vehicle at the time when the possibility that the host vehicle is going to enter the parking lot is detected. A y-coordinate value of the coordinate point indicates a frontward rearward displacement of the host vehicle from the origin point. The positive y-coordinate value and the negative y-coordinate value, respectively, correspond to the front direction and the rear direction of the host vehicle at the time when the possibility that the host vehicle is going to enter the parking lot is detected.

The coordinate point of the host vehicle is calculated from the wheel speed average value V of the tire wheels detected with the tire wheel speed detection section 11 and the yaw rate Mz detected with the turn state detection section 13. The coordinate point of the host vehicle may be calculated in a manner similar to that in known autonomous navigation. Specifically, the coordinate point of the host vehicle is calculated based on the yaw angle, which is a value of integral of the yaw rate Mz, and the running distance, which is a value of integral of the tire wheel speed. The coordinate point calculation section 62 continue to successively calculate the present coordinate point of the host vehicle based on the tire wheel speed detected with the tire wheel speed detection section 11 and the yaw rate Mz detected with the turn state detection section 13. The coordinate point calculation section 62 can correspond to a coordinate point calculation means.

The calculated present coordinate point of the host vehicle is recorded and stored in a non-volatile memory such as the EEPROM and the like, and is maintained even if the IG switch is turned off. Then, if the IG switch is turned on and the host vehicle starts moving, the coordinate point calculation section 62 restarts calculating the present coordinate point of the host vehicle based on the latest coordinate point stored in the non-volatile memory.

At S25, the vehicle state determination section 63 determines whether or not the average value V of the tire wheel speeds of the respective tire wheels detected with the tire wheel speed detection section 11 is smaller than a predetermined lower limit V1. In the above, the lower limit $V_1$ is approximately an average tire wheel speed corresponding to the vehicle speed at a time when the vehicle travels in a parking lot. For example, the lower limit $V_1$ may be set to an average tire wheel speed at a time when the vehicle speed is approximately 20 km/h. This lower limit $V_1$ and the above-described lower limit $V_L$ may have the same value.

When it is determined that the average tire wheel speed value V falls below the lower limit $V_1$, corresponding to YES at S25, the process proceeds to S26. When it is determined that the average tire wheel speed value V does not fall below the lower limit $V_1$, corresponding to NO at S25, the process proceeds to S32.

At S26, the vehicle state determination section 63 determines whether or not the host vehicle is stopped or parked. A determination of whether or not the host vehicle is stopped or parked may be made based on the signal of the IG switch. For example, when determining that the IG switch is turned off, the vehicle state determination section 63 may determine that the host vehicle is stopped or parked. Alternatively, the determination of whether or not the host vehicle is stopped or parked may be made based on the sensor signal of the gear shifter position sensor 8. For example, when detecting that the gear shifter is in the position "P" or "N", the vehicle state determination section 63 may determine that the host vehicle is stopped or parked. The parking lot exit determination apparatus 6 is configured to be capable of receiving electric power from a backup battery or a main battery of the host vehicle even when the IG switch is in an off state.

When it is determined that the host vehicle is stopped or parked, corresponding to YES at S26, the procedure proceeds to S27. When it is determined that the host vehicle is not stopped nor parked, corresponding to NO at S26, the procedure returns to S25.

At S27, the vehicle state determination section 63 determines whether or not the host vehicle starts moving. A determination of whether or not the host vehicle starts moving may be based on the signal of the IG switch. For example, when determining that the IG switch is switched from off to on, the vehicle state determination section 63 may determine that the host vehicle starts moving. Alternatively, the determination of whether or not the host vehicle starts moving may be based on the sensor signal of the gear shifter position sensor 8. For example, when detecting that the position of the gear shifter is changed from "P" or "N" to "D" or "R", the vehicle state determination section 63 may determine that the host vehicle starts moving.

When it is determined that the host vehicle starts moving, corresponding to YES at S27, it is estimated that the vehicle starts moving after stopping or parking, and the procedure proceeds to S27. When it is determined that the host vehicle does not start moving, corresponding to NO at S27, S27 is repeated. The vehicle state determination section 63 can correspond to an after-stop movement detection means or section.

At S28, the above-described exit estimation waiting state is terminated, so that the exit determination for left turn entry and the exit determination for right turn entry can be started. Then, the procedure proceeds to S29. At S29, the vehicle state determination section 63 determines whether or not the lateral displacement x of the present coordinate point of the host vehicle is smaller than zero. When it is determined that the lateral displacement x of the present coordinate point of the host vehicle is smaller than zero, corresponding to YES at S29, it is estimated that the host vehicle had entered the parking lot from the road by turning left, and the procedure proceeds to S30. When it is determined that the lateral displacement x of the present coordinate point of the host vehicle is not smaller than zero, corresponding to NO at S29, it is estimated that the host vehicle had entered the parking lot from the road by turning right, and the procedure proceeds to S31.

Figure 9:
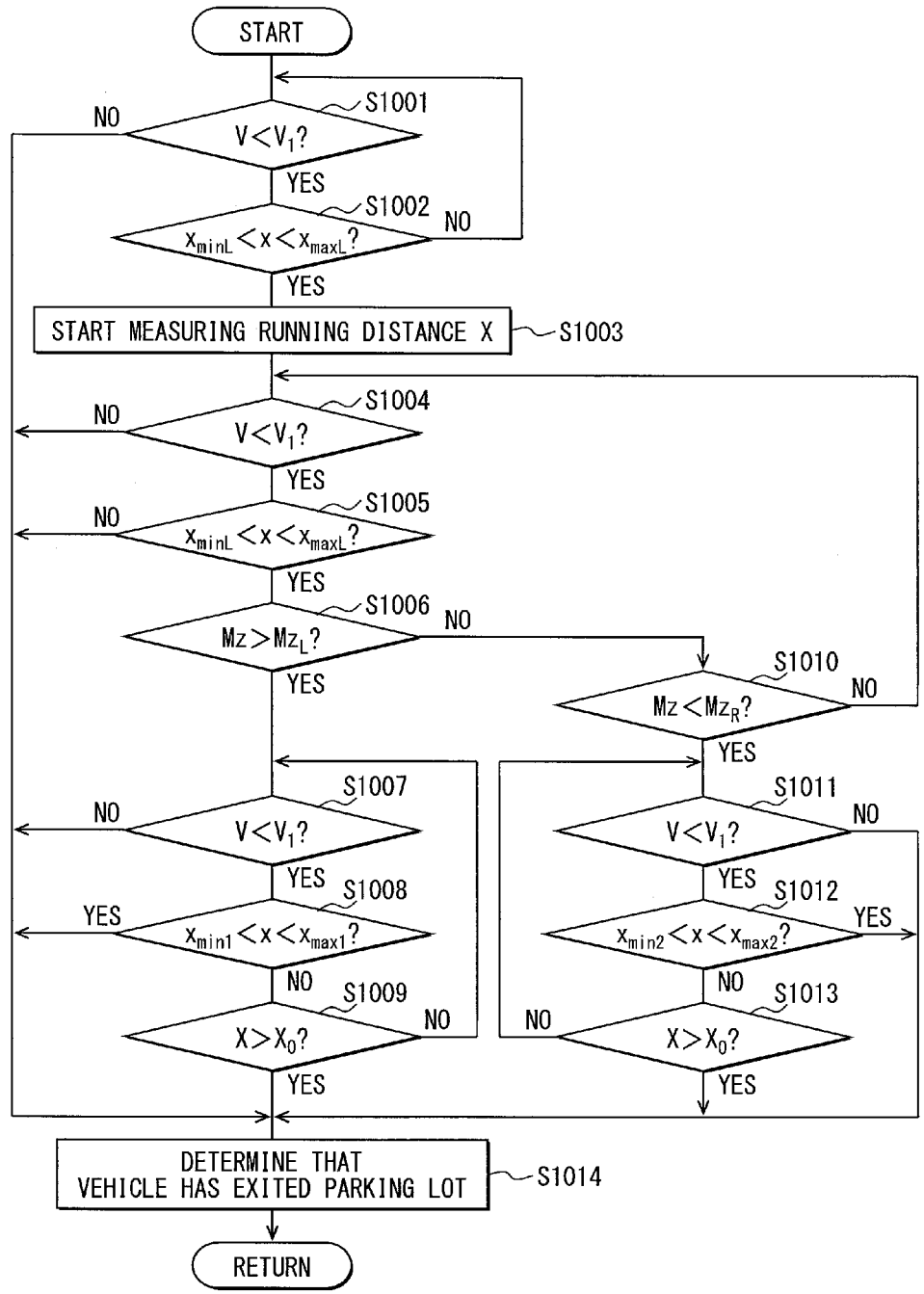
FIG. 9 is a flowchart illustrating an operation procedure of an exit determination process for left-turn-entry.

At S30, the exit determination for left turn entry is performed, and then the process proceeds S32. Now, the exit determination for left turn entry will be described with reference to FIG. 9. FIG. 9 is a flowchart illustrating one example of an operation procedure of the exit determination process for left-turn-entry.

At S1001, the vehicle state determination section 63 determines whether or not the average value of the tire wheel speed of the tire wheels detected with the tire wheel speed detection section 11 is smaller than a predetermined lower limit V1. When it is determined that the average tire wheel speed value V is smaller than the lower limit V1, corresponding to YES at S1001, the process proceeds to S1002. When it is determined that the average tire wheel speed value V is not smaller than the lower limit V1, corresponding to NO at S1002, the procedure proceeds to S1014.

At S1002, the vehicle state determination section 63 determines whether or not the lateral displacement x of the present coordinate point of the host vehicle is larger than a predetermined lower limit $x_{minL}$ and is smaller than a predetermined upper limit $x_{maxL}$. In other words, it is determined whether or not a relation $x_{minL} < x < x_{maxL}$ is satisfied. In the above, the predetermined lower limit $x_{minL}$ and the predetermined upper limit $x_{maxL}$ are set to approximately correspond to a width of lateral displacement of a boundary region between the road and the parking lot when the host vehicle enters the parking lot from the road by turning left. In other words, the predetermined lower limit $x_{minL}$ and the predetermined upper limit $x_{maxL}$ are set so that it can be determined whether or not the present position of the host vehicle is within this border region, based on whether or not the lateral displacement x of the coordinate point of the host vehicle is in a range from the lower limit $x_{minL}$ to the upper limit $x_{maxL}$.

When it is determined the relation $x_{minL} < x < x_{maxL}$ is satisfied, corresponding to YES at S1002, the procedure proceeds to S1003. When it is determined that the relation $x_{minL} < x < x_{maxL}$ is not satisfied, corresponding to NO at S1002, the procedure returns to S1001. At S1003, the running distance measurement section 17 starts measuring the running distance X of the host vehicle, and the procedure proceeds to S1004. The running distance measurement section 17 may measure the running distance of the host vehicle by, for example, integrating the tire wheel speed detected with the tire wheel speed detection section 11.

At S1004, the vehicle state determination section 63 determines whether or not the average value V of the tire wheel speed of the tire wheels detected with the tire wheel speed detection section 11 is smaller than the lower limit V1. When it is determined that the average tire wheel speed value V is lower than the lower limit $V_1$, corresponding to YES at S1004, the procedure proceeds to S1005. When it is determined that the average tire wheel speed value V does not fall below the lower limit $V_1$, corresponding to NO at S1004, the procedure proceeds to S1014.

At S1005, the vehicle state determination section 63 determines whether or not the lateral displacement x of the present coordinate point of the host vehicle is larger than a predetermined lower limit $x_{minL}$ and smaller than a predetermined upper limit $x_{maxL}$. In other words, it is determined whether a relation $x_{minL} < x < x_{maxL}$ is satisfied. When it is determined that the relation $X_{minL} < x < x_{maxL}$ is satisfied, corresponding to YES at S1005, the procedure proceeds to S1006. When it is determined that the relation $x_{minL} < x < x_{maxL}$ is not satisfied, corresponding to NO at S1005, the procedure proceeds to S1014.

At S1006, based on the sensor signal from the yaw rate sensor 7, the turn state detection section 13 detects the yaw rate Mz of the host vehicle, and the exit direction estimation section 64 determines whether or not the detected yaw rate Mz is larger than a predetermined threshold $Mz_L$. In the above, the predetermined threshold $Mz_L$ is arbitrarily settable to approximately correspond to a minimum yaw rate Mz in the left turn direction in cases where a vehicle merges into a road from a parking lot while turning left.

When it is determined that the yaw rate Mz is larger than the threshold $Mz_L$, corresponding to YES at S1006, it is estimated that the vehicle exits the parking lot and goes to the road while turning left, and the procedure proceeds to S1007. When it is determined that the yaw rate Mz is not larger than the threshold $Mz_L$, corresponding to NO at S1006, the procedure proceeds to S1010. The exit direction estimation section 64 can correspond to an exit direction estimation means.

At S1007, the vehicle state determination section 63 determines whether or not the average value V of the tire wheel speed of the tire wheels detected with the tire wheel speed detection section 11 is smaller than a lower limit V1. When it is determined that the tire wheel speed average value V is smaller than the lower limit V1, corresponding to YES at S1007, the procedure proceeds to S1008. When it is determined that the tire wheel speed average value V is not smaller than the lower limit V1, corresponding to NO at S1007, the procedure proceeds to S1014.

At S1008, the exit determination section 65 determines whether or not the lateral displacement x of the present coordinate point of the host vehicle is larger than a predetermined lower limit $x_{min1}$ and is smaller than a predetermined upper limit $x_{max1}$. In other words, the exit determination section 65 determines whether or not a relation $x_{min1} < x < x_{max1}$ is satisfied. When it is determined that the relation $x_{min1} < x < x_{max1}$ is satisfied, corresponding to YES at S1008, the procedure proceeds to S1009. When it is determined that the relation $x_{min1} < x < x_{max1}$ is not satisfied, corresponding to NO at S1008, the procedure proceeds to S1014.

Figure 10:
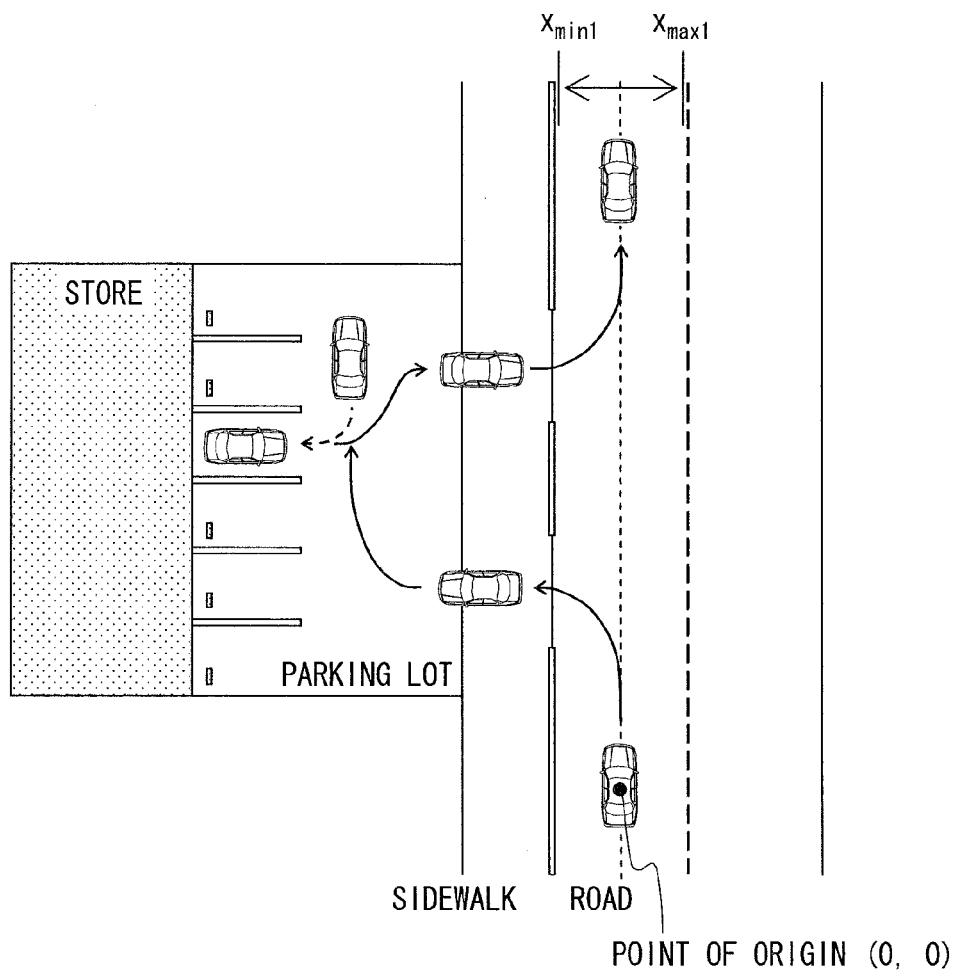
FIG. 10 is a diagram for explaining a predetermined lower limit $x_{min1}$ and a predetermined upper limit $x_{max1}$.

Now, with reference to FIG. 10, the predetermined lower limit $x_{min1}$ and the predetermined upper limit $x_{max1}$ will be explained. FIG. 10 is a diagram for explaining the predetermined lower limit $x_{min1}$ and the predetermined upper limit $X_{max1}$.

As shown in FIG. 10, the predetermined lower limit $x_{min1}$ and the predetermined upper limit $x_{max1}$ are set from degrees of an upper limit and a lower limit of a certain possible lateral displacement. The certain lateral displacement is a possible lateral displacement of the host vehicle that travels on a road, from which the host vehicle enters the parking lot while turning left. In other words, the predetermined lower limit $x_{min1}$ and the predetermined upper limit $x_{max1}$ are set so that based on whether or not the lateral displacement x of the coordinate position of the host vehicle falls within a range between the lower limit $x_{min1}$ and the upper limit $x_{max1}$, it can be determined whether or not there is a high possibility that the present position of the host vehicle is on the road on which the vehicle had traveled in entering the parking lot while turning left. For example, the lower limit $x_{min1}$ and the upper limit $x_{max}$ may be set in consideration of an average road width.

Explanation returns to FIG. 9. At S1009, the exit determination section 65 determines whether or not the running distance X, measurement of which is started from S1003, exceeds a predetermined distance X0. In other words, it is determined whether or not a relation X>X0 is satisfied. In the above, the predetermined distance X0 is arbitrarily settable and may be set to, for example, a few meters. When it is determined that the relation X>X0 is satisfied, corresponding to YES at S1009, the procedure proceeds to S1014. When it is determined that the relation X>X0 is not satisfied, corresponding to NO at S1009, the procedure returns to S1007.

At S1010, the exit direction estimation section 64 determines whether or not the yaw rate Mz, which is detected at S1006, is smaller than a predetermined threshold $Mz_R$. In the above, the threshold $Mz_R$ is arbitrarily settable to approximately correspond to a minimum yaw rate Mz in a right turn direction when the host vehicle merges into the road from the parking lot while turning right.

When it is determined that the yaw rate Mz is smaller than the threshold $Mz_R$, corresponding to YES at S1010, it is estimated that the host vehicle exits the parking lot and goes to the road while turning right, and the procedure proceeds to S1011. When it is determined that the yaw rate Mz is not smaller than the threshold $Mz_R$, corresponding to NO at S1010, the procedure returns to S1004.

At S1011, the vehicle state determination section 63 determines whether or not the average value of the tire wheel speed of the tire wheels detected with the tire wheel speed detection section 11 is smaller than the predetermined lower limit V1. When it is determined that the tire wheel speed average value V is smaller than the lower limit V1, corresponding to YES at S1011, the process proceeds to S1012. When it is determined that the tire wheel speed average value V is not smaller than the lower limit V1, corresponding to NO at S1011, the process proceeds to S1014.

At S1012, the exit determination section 65 determines whether or not the lateral displacement x of the present coordinate point of the host vehicle is larger than a predetermined lower limit $x_{min2}$ and is smaller than a predetermined upper limit $x_{max2}$. In other words, the exit determination section 65 determines whether or not a relation $x_{min2} < x < x_{max2}$ is satisfied. When it is determined that the relation $x_{min2} < x < x_{max2}$ is satisfied, corresponding to YES at S1012, the procedure proceeds to S1014. When it is determined that the relation $x_{min2} < x < x_{max2}$ is not satisfied, corresponding to NO at S1012, the procedure proceeds to S1013.

Figure 11:
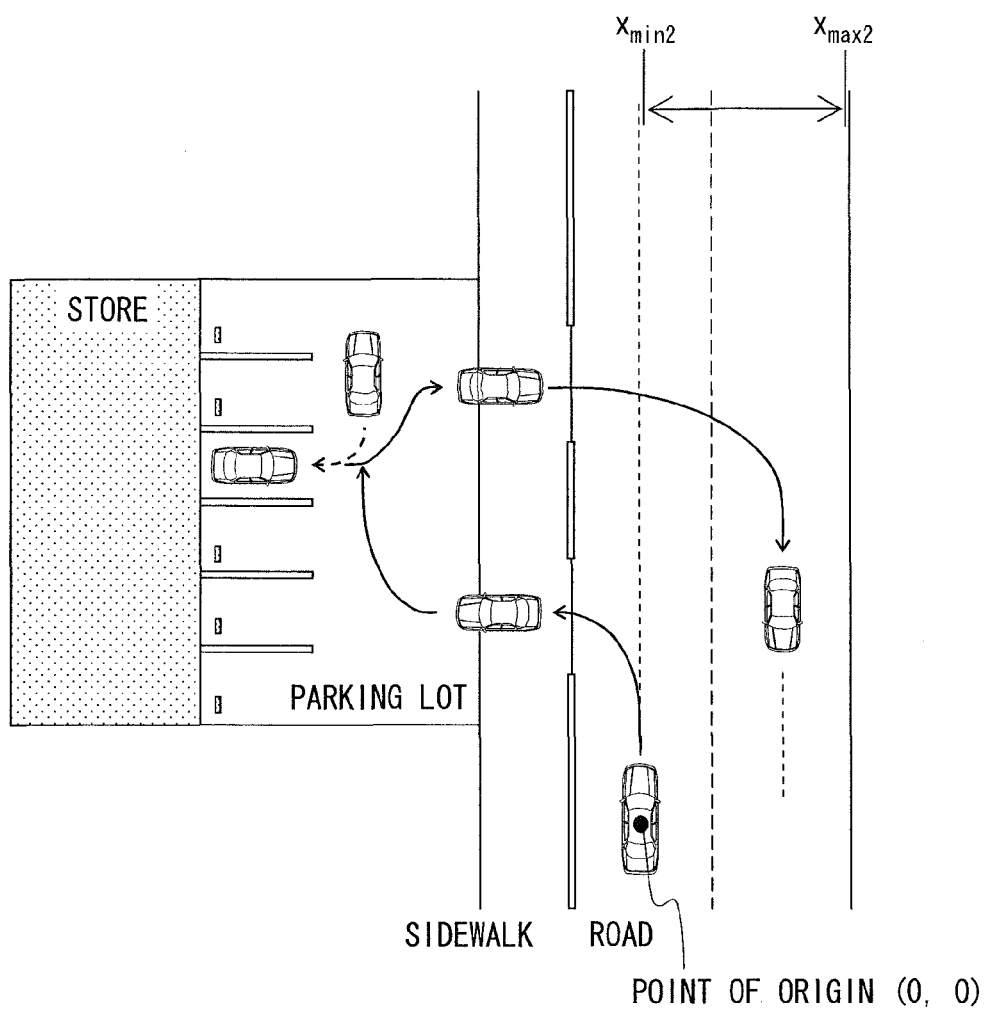
FIG. 11 is a diagram for explaining a predetermined lower limit $x_{min2}$ and a predetermined upper limit $x_{max2}$.

With reference to FIG. 11, the predetermined lower limit $x_{min2}$ and the predetermined upper limit $x_{max2}$ will be explained. FIG. 11 is a diagram for explaining the predetermined lower limit $x_{min2}$ and the predetermined upper limit $x_{max2}$.

As shown in FIG. 11, the predetermined lower limit $x_{min2}$ and the predetermined upper limit $x_{max2}$ are set in consideration of degrees of an upper limit and a lower limit of a possible certain lateral displacement x of the host vehicle. The certain lateral displacement is a possible lateral displacement of the host vehicle that travels on a lane, a traffic direction of which is opposite to that of a lane from which the host vehicle enters the parking lot while turning left. In other words, the predetermined lower limit $x_{min2}$ and the predetermined upper limit $x_{max2}$ are set so that, based on whether or not the lateral displacement x of the coordinate point of the host vehicle falls within a range between the lower limit $x_{min2}$ and the upper limit $x_{max2}$, it can be determined whether or not there is a high possibility that the present position of the host vehicle is on a lane, a traffic way of which is opposite to that of a lane on which the vehicle had traveled in entering the parking lot by turning left. As shown in FIG. 11, the lower limit $x_{min2}$ may be set smaller than at least zero.

Explanation returns to FIG. 9. At S1013, the exit determination section 65 determines whether or not the running distance X, measurement of which is started from S1003, exceeds a predetermined distance $X_0$. In other words, it is determined whether or not a relation $X > X_0$ is satisfied. When it is determined that the relation $X > X_0$ is satisfied, corresponding to YES at S1013, the procedure proceeds to S1014. When it is determined that the relation $X > X_0$ is not satisfied, corresponding to NO at S1013, the procedure returns to S1011. At S1014, the exit determination section 65 determines that the host vehicle has exited the parking lot, and the procedure proceeds to S32. The exit determination section 65 can correspond to an exit determination means.

Figure 12:
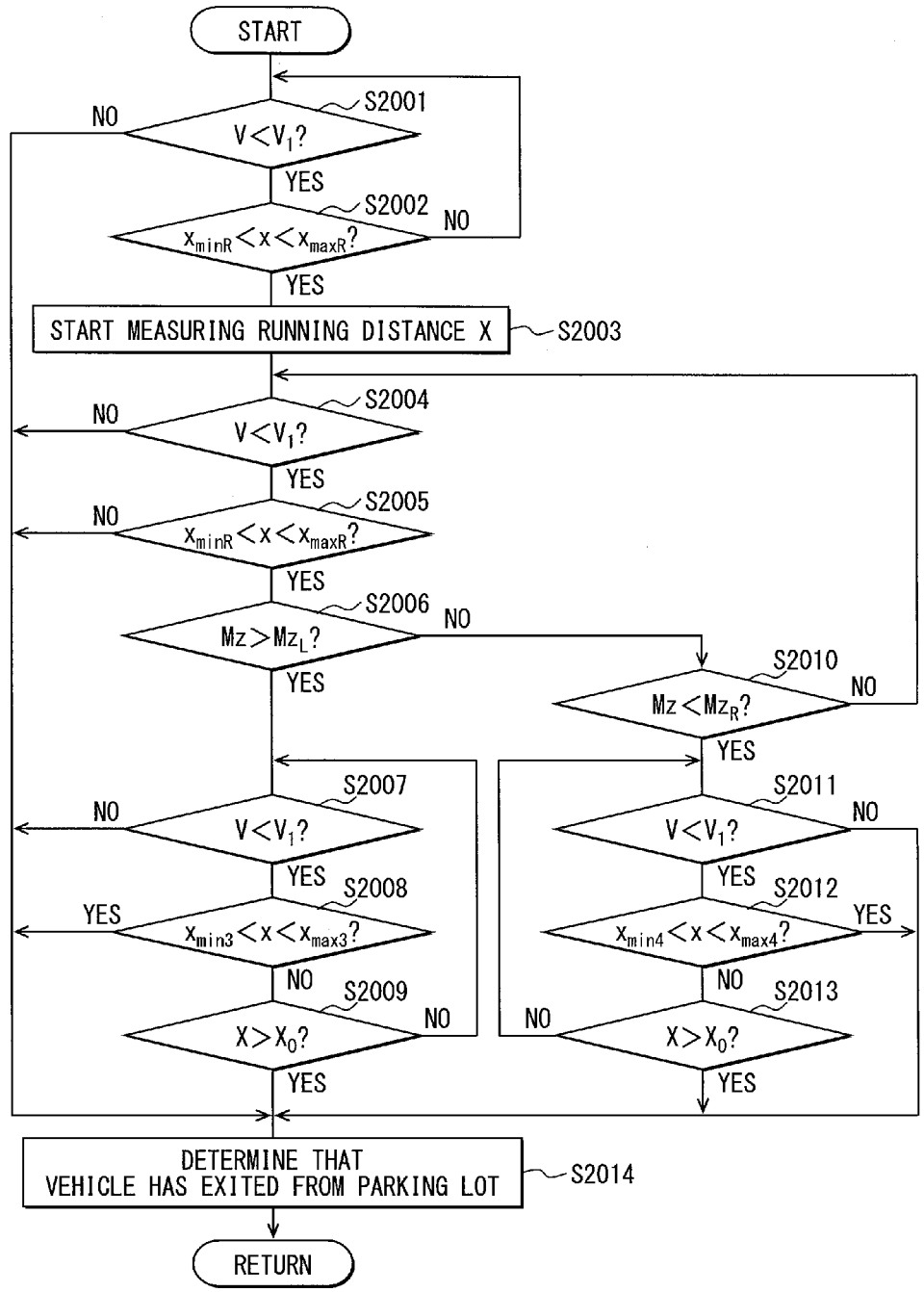
FIG. 12 is a diagram illustrating an operation procedure of an exit determination process for right-turn-entry.

At S31, the level difference determination for right turn entry is performed, and then the procedure proceeds to S32. Now, the level difference determination for right turn entry will be described with reference to FIG. 12. FIG. 12 is a flowchart illustrating one example of an operation procedure of the exit determination for right turn entry.

At S2001, the vehicle state determination section 63 determines whether or not the average value V of the tire wheel speed of the tire wheels detected with the tire wheel speed detection section 11 is smaller than a predetermined lower limit V1. When it is determined that the average tire wheel speed value V is smaller than the lower limit V1, corresponding to YES at S2001, the procedure proceeds to S2002. When it is determined that the average tire wheel speed value V is not smaller than the lower limit V1, corresponding to NO at S2001, the procedure proceeds to S2014.

At S2002, the vehicle state determination section 63 determines whether or not the lateral displacement x of the present coordinate point of the host vehicle is larger than a predetermined lower limit $x_{minR}$ and is smaller than a predetermined upper limit $x_{maxR}$. In other words, it is determined whether or not a relation $x_{minR}<x<x_{maxR}$ is satisfied. In the above, the predetermined lower limit $x_{minR}$ and the predetermined upper limit $x_{maxR}$ are set to approximately correspond to a width of lateral displacement of a boundary region between the road and the parking lot when the host vehicle enters the parking lot from the road by turning right. In other words, the predetermined lower limit $x_{minR}$ and the predetermined upper limit $x_{maxR}$ are set so that it can be determined whether or not the present position of the host vehicle is within this border region, based on whether or not the lateral displacement x of the coordinate point of the host vehicle is in a range from the lower limit $x_{minR}$ to the upper limit $x_{maxR}$.

When it is determined that the relation $x_{minR}<x<x_{maxR}$ is satisfied, corresponding to YES at S2002, the procedure proceeds to S2003. When it is determined that the relation $x_{minR}<x<x_{maxR}$ is not satisfied, corresponding to NO at S2002, the procedure returns to S2001. At S2003, the running distance measurement section 17 starts measuring the running distance X of the host vehicle, and the procedure proceeds to S2004.

At S2004, the vehicle state determination section 63 determines whether or not the average value V of the tire wheel speeds of the tire wheels is smaller than a predetermined lower limit V1. When it is determined that the average tire wheel speed value V is smaller than the lower limit V1, corresponding to YES at S2004, the procedure proceeds to S2005. When it is determined that the average tire wheel speed value V is not smaller than the lower limit V1, corresponding to NO at S2004, the procedure proceeds to S2014.

At S2005, the vehicle state determination section 63 determines whether or not the lateral displacement x of the present coordinate point of the host vehicle is larger than the predetermined lower limit $x_{minR}$ and is smaller than the predetermined upper limit $x_{maxR}$. In other words, the vehicle state determination section 63 determines whether or not a relation $x_{minR}<x<x_{maxR}$ is satisfied. When it is determined that the relation $x_{minR}<x<x_{maxR}$ is satisfied, corresponding to YES at S2005, the procedure proceeds to S2006. When it is determined that the relation $x_{minR}<x<x_{maxR}$ is not satisfied, corresponding to NO at S2005, the procedure proceeds to S2014.

At S2006, based on the sensor signal from the yaw rate sensor 7, the turn state detection section 13 detects the yaw rate Mz of the host vehicle. In addition, the exit direction estimation section 64 determines whether or not the detected yaw rate Mz is larger than a predetermined threshold $Mz_L$. When it is determined that the yaw rate Mz is larger than the threshold $Mz_L$, corresponding to YES at S2006, it is estimated that the vehicle exits the parking lot and goes to the road while turning left, and the procedure proceeds to S2007. When it is determined that the yaw rate Mz is not larger than the threshold $Mz_L$, corresponding to NO at S2006, the procedure proceeds to S2010.

At S2007, the vehicle state determination section 63 determines whether or not the average value V of the tire wheel speed of the tire wheels detected with the tire wheel speed detection section 11 is smaller than a predetermined lower limit V1. When it is determined that the average tire wheel speed value V is smaller than the lower limit V1, corresponding to YES at S2007, the procedure proceeds to S2008. When it is determined that the average tire wheel speed value V is not smaller than the lower limit V1, corresponding to NO at S2007, the procedure proceeds to S2014.

At S2008, the exit determination section 65 determines whether or not the lateral displacement x of the present coordinate point of the host vehicle is larger than a predetermined lower limit $x_{min3}$ and is smaller than a predetermined upper limit $x_{max3}$. In other words, the exit determination section 65 determines whether or not a relation $x_{min3}<x<x_{max3}$ is satisfied. When it is determined that the relation $x_{min3}<x<x_{max3}$ is satisfied, corresponding to YES at S2008, the procedure proceeds to S2009 S2014. When it is determined that the relation $x_{min3}<x<x_{max3}$ is not satisfied, corresponding to NO at S2008, the procedure proceeds to S2009.

In the above, the predetermined lower limit $x_{min3}$ and the predetermined upper limit $x_{max3}$ are set from degrees of an upper limit and a lower limit of a possible lateral displacement of the host vehicle. The possible lateral displacement is a possible lateral displacement of the host vehicle that travels on a road in entering the parking lot from the road while turning right. The lower limit $x_{min3}$ and the lower limit $x_{min1}$ may be the same. The upper limit $x_{max3}$ and the upper limit $x_{max1}$ may be the same.

At S2009, the exit determination section 65 determines whether or not the running distance X, measurement of which is started from S2003, exceeds a predetermined distance X0. In other words, it is determined whether or not a relation X>X0 is satisfied. When it is determined that the relation X>X0 is satisfied, corresponding to YES at S2009, the procedure proceeds to S2014. When it is determined that the relation X>X0 is not satisfied, corresponding to NO at S2009, the procedure returns to S2007.

At S2010, the exit direction estimation section 64 determines whether or not the yaw rate Mz, which is detected at S2006, is smaller than a predetermined threshold $Mz_R$. When it is determined that the yaw rate Mz is smaller than the threshold $Mz_R$, corresponding to YES at S2010, it is estimated that the host vehicle exits the parking lot and goes to the road while turning right, and the procedure proceeds to S2011. When it is determined that the yaw rate Mz is not smaller than the threshold $Mz_R$, corresponding to YES at S2010, the procedure returns to S2004.

At S2011, the vehicle state determination section 63 determines whether or not the average value V of the tire wheel speed of the tire wheels detected with the tire wheel speed detection section 11 is smaller than a predetermined lower limit V1. When it is determined that the average tire wheel speed value V is smaller than the lower limit V1, corresponding to YES at S2011, the procedure proceeds to S2012. When it is determined that the average tire wheel speed value V is not smaller than the lower limit V1, corresponding to NO at S2011, the procedure proceeds to S2014.

At S2012, the exit determination section 65 determines whether or not the lateral displacement x of the present coordinate point of the host vehicle is larger than a predetermined lower limit $x_{min4}$ and is smaller than a predetermined upper limit $x_{max4}$. In other words, the exit determination section 65 determines whether or not a relation $x_{min4}<x<x_{max4}$ is satisfied. When it is determined that the relation $x_{min4}<x<x_{max4}$ is satisfied, corresponding to YES at S2012, the procedure proceeds to S2014. When it is determined that the relation $x_{min4}<x<x_{max4}$ is not satisfied, corresponding to NO at S2012, the procedure proceeds to S2013.

In the above, the predetermined lower limit $x_{min4}$ and the predetermined upper limit $x_{max4}$ are set in consideration of degrees of an upper limit and a lower limit of a certain lateral displacement. The certain lateral displacement is a possible lateral displacement of the host vehicle that travels on a road, a traffic way of which is opposite to that of a road from which the host vehicle enters the parking lot while turning right. The lower limit $x_{min4}$ and the lower limit $x_{min2}$ may be the same. The upper limit $x_{max4}$ and the upper limit $x_{min2}$ may be the same.

At S2013, the exit determination section 65 determines whether or not the running distance X, measurement of which is started from S1003, exceeds a predetermined distance $X_0$. In other words, it is determined whether or not a relation $X>X_o$ is satisfied. When it is determined that the relation $X>X_0$ is satisfied, corresponding to YES at S2013, the procedure proceeds to S2014. When it is determined that the relation $X>X_0$ is not satisfied, corresponding to NO at S2013, the procedure returns to S2011. At S2014, the exit determination section 65 determines that the host vehicle has exited the parking lot, and the procedure proceeds to S32.

Explanation returns to FIG. 8. At S32, the parking lot exit determination apparatus 6 is put in the exit estimation waiting state, so that the exit determination for left turn entry and the exit determination for right turn entry are prevented from starting. After S32, the procedure returns to S21. The parking lot exit determination apparatus 6 may be configured as follows. When it is determined that the host vehicle has exited the parking lot at the exit determination for left turn entry or the exit determination for right turn entry, the parking lot exit determination apparatus 6 may command the parking lot entry determination apparatus 1 to stop performing the sudden acceleration suppression process and the braking force increase process.

According to the above configuration, it is determined whether or not the host vehicle has exited the parking lot, based on a determination of whether or not the lateral displacement of the present coordinate point of the host vehicle is within a predetermined threshold range. The predetermined threshold range depends on the exit direction estimated by the exit direction estimation section 64. Therefore, in a manner appropriate for the exit direction, it is possible to highly accurately determine whether or not the vehicle has exited the parking lot.

According to the above configuration, in order to determine whether or not the vehicle has exited the parking lot, the parking lot exit determination apparatus 6 does not detect the vertical direction acceleration associated with the up and down movement of the host vehicle and does not use the map matching data or map data of an in-vehicle navigation apparatus. Instead, the parking lot exit determination apparatus 6 detects the tire wheel speed, the turn direction and the degree of turn of the host vehicle in order to determine whether or not the vehicle has exited the parking lot.

The yaw rate sensor, which is used to detect the turn direction and the degree of turn, is generally mounted in a vehicle equipped with an electronic stability control (ESC) system for preventing skidding or the like. The yaw rate sensor is pre-installed in a vehicle at a higher rate than the acceleration sensor which detects the vertical direction acceleration or the in-vehicle navigation apparatus is. Moreover, as described above, the wheel speed sensor is also pre-installed in a vehicle at a higher rate than the acceleration sensor which detects the vertical direction acceleration or the in-vehicle navigation apparatus is. Therefore, in many cases, additional installation of the yaw rate sensor and the wheel speed sensor is not required. Therefore, the present embodiment can reduce cost as compared with cases where the in-vehicle navigation apparatus and the acceleration sensor detecting the vertical direction acceleration are required.

In the above example of the present embodiment, the parking lot entry determination apparatus 1 is configured such that the turn state detection section 13 detects the steering angle based on the sensor signal from the steering angle sensor 3, and uses this steering angle as information for the turn direction and the degree of turn. However, this configuration can be modified. For example, the parking lot entry determination apparatus 1 may be configured such that the turn state detection section 13 detects the yaw rate based on the sensor signal from the yaw rate sensor 7, and uses this yaw rate as information for the turn direction and the degree of turn.

In the above example of the present embodiment, the parking lot exit determination apparatus 6 is configured such that the turn state detection section 13 detects the yaw rate based on the sensor signal from the yaw rate sensor 7, and uses this yaw rate as information for the turn direction and the degree of turn. Alternatively, for example, the parking lot exit determination apparatus 6 may be configured such that the turn state detection section 13 detects the steering angle based on the sensor signal from the steering angle sensor 3, and uses this steering angle as information for the turn direction and the degree of turn.

In the above example of the present embodiment, the parking lot entry determination apparatus 1 and the parking lot exit determination apparatus 6 are applied to a four-wheeled vehicle. Alternatively, for example, the parking lot entry determination apparatus 1 and the parking lot exit determination apparatus 6 may be applied to a six-wheeled vehicle such as truck and the like, or a two-wheeled vehicle, or a vehicle equipped with arbitrary number of tire wheels.

In the above example of the present embodiment, the parking lot entry determination apparatus 1 and the parking lot exit determination apparatus 6 are applied to an internal combustion engine powered vehicle, which uses only an internal combustion engine as a traveling power source. Alternatively, the parking lot entry determination apparatus 1 and the parking lot exit determination apparatus 6 may be applied to other vehicle such as a hybrid vehicle (HV) or an electric vehicle (EV), which uses a motor as a traveling power source. In this case, the running distance may be measured from a value of integral of the number of rotation of the motor.

The present disclosure has various aspects.

For example, according to a first example of the present disclosure, a driving assistance apparatus mounted to a vehicle includes a tire wheel speed detection section, a tire wheel speed change calculation section, a threshold determination section, an order specifying section and a level difference crossing determination section. The tire wheel speed detection section is configured to successively detect tire wheel speed of each tire wheel of tire wheels of the vehicle. The tire wheels of the vehicle include at least one front tire wheel and at least one rear tire wheel. The tire wheel speed change calculation section is configured to calculate an amount of change in the tire wheel speed, which is detected with the tire wheel speed detection section, of each tire wheel. The threshold determination section is configured to determine whether or not the amount of change in the tire wheel speed of each tire wheel, which is calculated by the tire wheel speed change calculation section, exceeds a threshold. The order specifying section is configured to specify a tire wheel crossing order. The tire wheel crossing order is an order in which the tire wheels of the vehicle cross over a level difference between a road and a parking lot when the vehicle crosses over the level difference. The level difference crossing determination section is configured to determine whether or not the vehicle has crossed over the level difference between the road and the parking lot, based on whether or not a threshold-exceeding order is identical to the tire wheel crossing order specified by the order specifying section. The threshold-exceeding order is an order in which the threshold determination section determines that the amounts of change in the tire wheel speed of the respective tire wheels exceed the threshold. In the above, if there is a sidewalk between a parking lot and a street, the above-described level difference may be a level difference between the sidewalk and the street. If there is no sidewalk between a parking lot and a street, the above-described level difference may be a level difference between the street and the parking lot.

At a time when a tire wheel crosses over the level difference, its tire wheel speed changes. Thus, when a vehicle crosses over the level difference, changes in tire wheel speed of respective tire wheels take place in order. According to the above driving assistance apparatus, a determination of whether or not the vehicle has crossed over the level difference is based on whether or not the threshold-exceeding order is identical to the tire wheel crossing order specified by the order specifying section. Therefore, it is possible to determine the entry of the vehicle into the parking lot and the exit of the vehicle from the parking lot.

According to the above configuration, in order to determine whether or not the vehicle has crossed over the level difference, the driving assistance apparatus does not detect a vertical direction acceleration associated with the up and down movement of the vehicle and dose not use the map matching data or map data of an in-vehicle navigation apparatus. Instead, the driving assistance apparatus detects the tire wheel speed of the vehicle in order to determine whether or not the vehicle has crossed over the level difference. A sensor used for detecting tire wheel speed is generally mounted to a vehicle equipped with an antilock brake system (ABS) or the like, and is pre-installed in a vehicle at a higher rate than an acceleration sensor for detecting the vertical direction acceleration and the in-vehicle navigation apparatus are. Therefore, in many cases, additional installation of the sensor used for detecting the tire wheel speed is not required. Therefore, it is possible to reduce cost, as compared with cases where the installation of the in-vehicle navigation apparatus or the acceleration sensor for detecting the vertical direction acceleration is required.

Let us consider a comparison example in which: based on the vertical direction acceleration, it is determined whether or not the vehicle has crossed over a level difference between a parking lot and a road. In this comparison example configuration, for example, there is a high possibility that even when the tire wheel crosses over an unevenness of a part of a road surface or a pebble, it is erroneously determined that the vehicle has crossed over the level difference.

According to the driving assistance apparatus, even when a tire wheel crosses over an unevenness of a part of a road surface or a pebble, an erroneous determination that the vehicle has crossed over the level difference hardly occurs. This is because when a front tire wheel crosses over an unevenness of a part of a road surface or a pebble, a change in tire wheel speed of a rear tire wheel is not detected although a change in tire wheel speed of the front tire wheel may be detected. Therefore, it becomes possible to highly accurately determine the entry of the vehicle into the parking lot or the exit of the vehicle from the parking lot.

The tire wheel crossing order depends on a turn direction of the vehicle, i.e., a right turn or a left turn. In view of this, the above driving assistance apparatus may be configured to further include a turn state detection section that is configured to detect at least a turn direction of the vehicle. Based on the turn direction of the vehicle detected with the turn state detection section, the order specifying section may specify the tire wheel crossing order, which is the order in which the tire wheels of the vehicle cross over the level difference between the road and the parking lot when the vehicle crosses over the level difference between the road and the parking lot. According to this configuration, it becomes possible to improve determination accuracy.

In the above driving assistance apparatus, the turn state detection section may further detect a degree of turn of the vehicle. In addition, the driving assistance apparatus may further include a starting-point determination section, a running distance measurement section, and a level difference reach distance estimation section. The starting-point determination section is configured to determine a starting-point tire wheel. The starting-point tire wheel is one of the tire wheels that is placed first in the tire wheel crossing order specified by the order specifying section. The tire wheels other than the starting-point tire wheel is a non-starting-point tire wheel. The running distance measurement section is configured to start measuring running distance of the non-starting-point tire wheel when the threshold determination section determines that the amount of change in the tire wheel speed of the starting-point tire wheel exceeds the threshold. The level difference reach distance estimation section is configured to estimate a level difference reach distance based on (i) a positional relation of the non-starting-point tire wheel with the starting-point tire wheel, (ii) the turn direction of the vehicle and (iii) the degree of turn of the vehicle, on assumption that the starting-point tire wheel crosses over the level difference at a time when the amount of change in the tire wheel speed of the starting-point tire wheel exceeds the threshold. The level difference reach distance is the running distance of the non-starting-point tire wheel from a first time to a second time. The first time is a time when the threshold determination section determines that the amount of change in the tire wheel speed of the starting-point tire wheel exceeds the threshold. The second time is a time when the amount of change in tire wheel speed of the non-starting-point tire wheel exceeds the threshold. When the threshold determination section fails to determine that the amount of change in the tire wheel speed of the non-starting-point tire wheel does not exceeds the threshold before the measured running distance of the non-starting-point tire wheel exceeds the estimated level difference reach distance, the level difference crossing determination section is prohibited from determining that the vehicle has crossed over the level difference.

The level difference reach difference of each non-starting-point tire wheel, which is a distance to the level difference from a certain position of the each non-starting-point tire wheel, is determined from the relation of the each non-starting-point tire wheel with the starting-point tire wheel, the turn direction of the vehicle, and the degree of turn of the vehicle. The certain position of the each non-starting-point tire wheel is a position at a time when the starting-point tire wheel crosses over the level difference. Because of the above, before the running distance of the each non-starting tire wheel exceeds the level difference reach distance, the change in tire wheel speed of each non-starting-point tire wheel happens. Therefore, it is possible to highly accurately determine whether or not the vehicle has crossed over the level difference, based on whether nor not the change in tire wheel speed of each non-starting-point tire wheel exceeds the threshold before the running distance of the each non-starting-point tire wheel exceeds the level difference reach distance of the each non-starting-point tire wheel.

The above driving assistance apparatus may be configured as follows. The vehicle is a four-wheeled vehicle equipped with four tire wheels, which are a front left tire wheel, a front right tire wheel, a rear left tire wheel and a rear right tire wheel, respectively. The tire wheel speed detection section successively detects the tire wheel speed of each tire wheel of the four tire wheels. Based on the turn direction of the vehicle detected with the turn state detection section, the order specifying section specifies the tire wheel crossing order, which is the order in which the four tire wheels cross over the level difference between the road and the parking lot when the vehicle crosses over the level difference.

According to this configuration, it is determined whether or not the amounts of change in the tire wheel speed of the respective four tire wheels exceed the threshold in an order identical to the tire wheel crossing order that is specified in accordance with the turn direction. It should be noted that the tire wheel crossing order depends on the turn direction of the vehicle, i.e., the right turn or the right turn. Therefore, it is possible to improve determination accuracy, as compared with the use of only one front tire wheel and one rear tire wheel. A determination as to the vehicle's entry into and exit from the parking lot can be made with high accuracy.

It is conceivable that the amount of change in tire wheel speed when the vehicle crosses over the level difference tends to increase with increasing vehicle speed. In view of this, the above driving assistance apparatus may further include a vehicle speed detection section that is configured to successively detect vehicle speed of the vehicle. The threshold determination section may set the threshold to a larger value as the vehicle speed detected with the vehicle speed detection section is larger. According to this configuration, as the detected vehicle speed is larger, it is possible to increase the threshold used for determining whether or not the amount of change in tire wheel speed exceeds the threshold. Therefore, the threshold d appropriate for vehicle speed can be set.

The above driving assistance apparatus may further include a parking lot outside run estimation section that is configured to estimate whether or not the vehicle runs outside the parking lot. In addition, the above driving assistance apparatus may be configured as follows. When the parking lot outside run estimation section estimates that the vehicle runs outside the parking lot, the level difference crossing determination section determines whether or not the vehicle has crossed over the level difference. When the parking lot outside run estimation section estimates that the vehicle is not running outside the parking lot, the level difference crossing determination section is prohibited from determining whether or not the vehicle has crossed over the level difference. When determining that that the vehicle has crossed over the level difference, the level difference crossing determination section determines that the vehicle has entered the parking lot.

According to this configuration, out of a determination as to the entry into the parking lot and a determination as to the exit from the parking lot, it is possible to make only a determination as to the entry of the vehicle into the parking lot from the road.

Alternatively, the above driving assistance apparatus may further include a parking lot entry possibility detection section that is configured to detect whether or not there is a possibility that the vehicle is going to enter the parking lot from the road. In addition, the above driving assistance apparatus may be configured as follows. When the parking lot entry possibility detection section detects that there is the possibility that the vehicle is going to enter the parking lot from the road, the level difference crossing determination section determines whether or not the vehicle has crossed over the level difference. When the parking lot entry possibility detection section does not detect the possibility that the vehicle is going to enter the parking lot from the road, the level difference crossing determination section is prohibited from determining whether or not the vehicle has crossed over the level difference. When determining that that the vehicle has crossed over the level difference, the level difference crossing determination section determines that the vehicle has entered the parking lot.

According to this configuration, out of a determination as to the entry into the parking lot and a determination as to the exit from the parking lot, it is possible to make only a determination as to the entry of the vehicle into the parking lot from the road.

The above driving assistance apparatus may be configured as follows. When the level difference crossing determination section determines that, after entering the parking lot, the vehicle has crossed over the level difference again, the level difference crossing determination section determines that the vehicle has exited the parking lot. In order to exit the parking lot, the vehicle again crosses over the level difference after entering the parking lot. Therefore, it is possible to determine the entry into the parking lot and the exit from the parking lot with high accuracy.

The above driving assistance apparatus may further include a sudden acceleration suppression section that is configured to suppress acceleration of the vehicle when the level difference crossing determination section determines that the vehicle has entered the parking lot. According to this configuration, when the vehicle enters the parking lot, it is possible to prevent the sudden acceleration of the vehicle, and it is possible to increase driving safety in the parking lot.

The above driving assistance apparatus may further include a pedal improper operation detection section and a braking force control section. The pedal improper operation detection section detects an improper operation of an acceleration pedal of the vehicle. The braking force control section increases a braking force of the vehicle in response to detection of the improper operation of the acceleration pedal by the pedal improper operation detection section after it is determined that the vehicle has entered the parking lot. According to this configuration, when the vehicle enters the parking lot and then the improper operation of the accelerator pedal is conducted, it becomes possible to facilitate stopping the vehicle and it becomes possible to forcibly stop the vehicle by not only preventing the sudden acceleration of the vehicle but also increasing the braking force. Therefore, it is possible to further enhance driving safety in a parking lot.

According to a second aspect of the present disclosure, a driving assistance apparatus mounted to a vehicle can be configured as follows. The driving assistance apparatus includes a tire wheel speed detection section, a turn state detection section, a vehicle speed detection section, a parking lot entry possibility detection section, an origin point determination section, a coordinate point calculation section, and an after-stop movement detection section. The tire wheel speed detection section is configured to successively detect tire wheel speed of a tire wheel of the vehicle. The turn state detection section is configured to successively detect a turn direction and a degree of turn of the vehicle. The vehicle speed detection section is configured to successively detect vehicle speed of the vehicle. The parking lot entry possibility detection section is configured to estimate whether or not the vehicle is going to enter a parking lot from a road. The origin point determination section is configured to determine a specific point as a point of origin of an absolute coordinate system. The specific point is a point at which the parking lot entry possibility detection section estimates that the vehicle is going to enter the parking lot from the road. The coordinate point calculation section is configured to successively calculate a present coordinate point of the vehicle in the absolute coordinate system having the determined point of origin based on (i) the tire wheel speed, which is successively detected with the tire wheel speed detection section, and (ii) the turn direction and the degree of turn, which are successively detected with the turn state detection section. The after-stop movement detection section is configured to detect whether or not the vehicle starts moving after stopping or parking. The exit determination section is configured to make an exit determination of whether or not the vehicle has exited the parking lot based on a positional relation between the point of origin and the coordinate point, which is successively calculated by the coordinate point calculation section. When the after-stop movement detection section detects that the vehicle starts moving after stopping or parking, the exit determination section makes the exit determination.

According to the above configuration, the point of origin of the absolute coordinate system is a point at which the parking lot entry possibility detection section estimates that the vehicle is going to enter the parking lot from the road. Therefore, the point of origin of the absolute coordinate system is on the road. In this case, when the vehicle enters the parking lot, the coordinate point of the vehicle moves away from the point of origin. By contrast, when the vehicle exits the parking lot, the coordinate point of the vehicle approaches the point of origin. Because of this, it is possible to determine the exit of the vehicle from the parking lot based on the positional relationship between the coordinate point of the vehicle and the point of origin.

Furthermore, according to the above configuration, in order to determine whether or not the vehicle has exited the parking lot, the driving assistance apparatus does not detect the vertical direction acceleration associated with the up and down movement of the vehicle and does not use the map matching data or map data of an in-vehicle navigation apparatus. Instead, the driving assistance apparatus detects the tire wheel speed, the turn direction and the degree of turn of the vehicle in order to determine whether or not the vehicle has exited the parking lot.

A sensor used for detecting the tire wheel speed is generally installed in a vehicle equipped with an antilock brake system (ABS) or the like. A sensor used for detecting the turn direction or the degree of turn is generally installed in a vehicle equipped with an electronic stability control (ESC) system or the like. Thus, the sensor used for detecting the tire wheel speed and the sensor used for detecting the turn direction or the degree of turn are pre-installed in a vehicle at a higher rate than an acceleration sensor used for detecting a vehicle vertical direction acceleration and an in-vehicle navigation apparatus. Therefore, the above driving assistance apparatus can reduce cost as compared with cases where the installation of the in-vehicle navigation apparatus and the acceleration sensor used for detecting the vertical direction acceleration is required.

The above driving assistance apparatus may be configured as follows. An axis along a left direction and a right direction of the vehicle at a specific point is set as a horizontal axis of the absolute coordinate system. The specific point is a point where the parking lot entry possibility detection section (12) estimates that the vehicle is going enter the parking lot from the road. Based on a displacement of the successively-calculated coordinate point from the point of origin in the horizontal axis, the exit determination section (65) determines whether or not the vehicle has exited the parking lot.

When the vehicle has entered the parking lot from the road, the displacement of the coordinate point of the vehicle from the point of origin in the horizontal axis becomes large. By contrast, when the vehicle has exited the parking lot by going to the road, the displacement of the coordinate point of the vehicle from the point of origin in the horizontal axis becomes small. Because of this, it is possible to determine the exit of the vehicle from parking lot based on the displacement of the coordinate point of the vehicle from the point of origin.

The above driving assistance apparatus may further include an exit direction estimation section that is configured to estimate whether or not an exit direction, in which the vehicle exits the parking lot, is the left direction or the right direction. When the displacement of the successively-calculated coordinate point from the point of origin in the horizontal axis is in a predetermine threshold range, the exit determination section determines that the vehicle has exited the parking lot. The predetermine threshold range depends on the exit direction estimated by the exit direction estimation section.

When the vehicle exits the parking lot by going to the road from which the vehicle had entered the parking lot, the vehicle exits the parking lot by turning left. In this case, the displacement of the coordinate point of the vehicle from the point of origin in the horizontal axis after the exiting become small as compared with cases where the vehicle is in the parking lot or the vehicle is on an opposite lane. By contrast, when the vehicle exits the parking lot by going to a road that is opposite in traffic way to the road from which the vehicle had entered the parking lot, the vehicle exits the parking lot by turning right. In this case, the displacement of the coordinate point of the vehicle from the point of origin in the horizontal axis after the exiting is approximately a displacement with a magnitude of a road width with respect to the point of origin in a direction away from the parking lot.

According to the above driving assistance apparatus, it is determined whether or not the vehicle has exited the parking lot, based on whether or not the displacement of the successively-calculated coordinate point from the point of origin in the horizontal axis is within the predetermined threshold range that depends on the turn direction. Therefore, in a manner appropriate for the turn direction, the determination as to the exit of the vehicle from the parking lot can be made with high accuracy.

According to a third aspect of the present disclosure, a driving assistance system includes a first driving assistance apparatus and a second driving assistance apparatus. The first driving assistance apparatus includes: the above-described tire wheel speed detection section; the above-described tire wheel speed change calculation section; the above-described threshold determination section; the above-described order specifying section; the above-described level difference crossing determination section; the above-described parking lot outside run estimation section; the above-described sudden acceleration suppression section; the above-described pedal improper operation detection section; and the above-described braking force control section. The second driving assistance apparatus includes: a vehicle speed detection section that is configured to successively detect vehicle speed of the vehicle; a parking lot entry possibility detection section that is configured to estimate whether or not the vehicle is going to enter a parking lot from a road; and an origin point determination section that is configured to determine a specific point as a point of origin of an absolute coordinate system. The specific point is a point at which the parking lot entry possibility detection section estimates that the vehicle is going to enter the parking lot from the road. The second driving assistance apparatus further includes: a coordinate point calculation section that is configured to successively calculate a present coordinate point of the vehicle in the absolute coordinate system having the determined point of origin based on (i) the tire wheel speed, which is successively detected with the tire wheel speed detection section, and (ii) the turn direction and the degree of turn, which are successively detected with the turn state detection section; an after-stop movement detection section that is configured to detect whether or not the vehicle starts moving after stopping or parking; and an exit determination section that is configured to make an exit determination of whether or not the vehicle has exited the parking lot based on a positional relation between the point of origin and the coordinate point successively calculated by the coordinate point calculation section. When the after-stop movement detection section detects that the vehicle starts moving after stopping or parking, the exit determination section makes the exit determination. When the exit determination section determines that the vehicle has exited the parking lot, suppression of the acceleration of the vehicle by the sudden acceleration suppression section is stopped and an increase in the braking force by the braking force control section is stopped.

According to the above-described driving assistance system, even when the acceleration of the vehicle is suppressed by the sudden acceleration suppression section or the braking force of the vehicle is increased by the braking force control section after the vehicle had entered the parking lot, it is possible to stop suppressing the acceleration of the vehicle and increasing braking force of the vehicle when the vehicle has exited the parking lot. Therefore, the above driving assistance system can eliminate a possibility that the suppression of the acceleration or the increase in the braking force disturbs smooth traveling of the vehicle on the road after the vehicle exits the parking lot.

While the invention has been described above with reference to various embodiments thereof, it is to be understood that the invention is not limited to the above described embodiments and constructions. The invention is intended to cover various modifications and equivalent arrangements.

What is claimed is:

1. A driving assistance apparatus mounted to a vehicle, comprising:
    a tire wheel speed detection section that is configured to successively detect tire wheel speed of each tire wheel of tire wheels of the vehicle, wherein the tire wheels of the vehicle include at least one front tire wheel and at least one rear tire wheel;
    a tire wheel speed change calculation section that is configured to calculate an amount of change in the tire wheel speed, which is detected with the tire wheel speed detection section, of each tire wheel;
    a threshold determination section that is configured to determine whether or not the amount of change in the tire wheel speed of each tire wheel, which is calculated by the tire wheel speed change calculation section, exceeds a threshold;
    an order specifying section that is configured to specify a tire wheel crossing order, wherein the tire wheel crossing order is an order in which the tire wheels of the vehicle cross over a level difference between a road and a parking lot when the vehicle crosses over the level difference; and
    a level difference crossing determination section that is configured to determine whether or not the vehicle has crossed over the level difference between the road and the parking lot, based on whether or not a threshold-exceeding order is identical to the tire wheel crossing order specified by the order specifying section, wherein the threshold-exceeding order is an order in which the threshold determination section determines that the amounts of change in the tire wheel speed of the respective tire wheels exceed the threshold.

2. The driving assistance apparatus according to claim 1, further comprising:
    a turn state detection section that is configured to detect at least a turn direction of the vehicle,
    wherein:
    based on the turn direction of the vehicle detected with the turn state detection section, the order specifying section specifies the tire wheel crossing order, which is the order in which the tire wheels of the vehicle cross over the level difference between the road and the parking lot when the vehicle crosses over the level difference between the road and the parking lot.

3. The driving assistance apparatus according to claim 2, wherein:
    the turn state detection section further detects a degree of turn of the vehicle,
    the driving assistance apparatus further comprising:
    an starting-point determination section that is configured determine an starting-point tire wheel, wherein the starting-point tire wheel is one of the tire wheels that is placed first in the tire wheel crossing order specified by the order specifying section, wherein the tire wheels other than the starting-point tire wheel is a non-starting-point tire wheel;
    a running distance measurement section that is configured to start measuring running distance of the non-starting-point tire wheel when the threshold determination section determines that the amount of change in the tire wheel speed of the starting-point tire wheel exceeds the threshold; and
    a level difference reach distance estimation section that is configured to estimate a level difference reach distance based on (i) a positional relation of the non-starting-point tire wheel with the starting-point tire wheel, (ii) the turn direction of the vehicle and (iii) the degree of turn of the vehicle, on assumption that the starting-point tire wheel crosses over the level difference at a time when the amount of change in the tire wheel speed of the starting-point tire wheel exceeds the threshold,
    wherein:
    the level difference reach distance is the running distance of the non-starting-point tire wheel
        from a time when the threshold determination section determines that the amount of change in the tire wheel speed of the starting-point tire wheel exceeds the threshold
        to a time when the amount of change in tire wheel speed of the non-starting-point tire wheel exceeds the threshold; and
    before the measured running distance of the non-starting-point tire wheel exceeds the estimated level difference reach distance, the level difference crossing determination section determines that the vehicle has not crossed over the level difference.

4. The driving assistance apparatus according to claim 2, wherein:
the vehicle is a four-wheeled vehicle equipped with four tire wheels, which are a front left tire wheel, a front right tire wheel, a rear left tire wheel and a rear right tire wheel, respectively;
the tire wheel speed detection section successively detects the tire wheel speed of each tire wheel of the four tire wheels; and
based on the turn direction of the vehicle detected with the turn state detection section, the order specifying section specifies the tire wheel crossing order, which is the order in which the four tire wheels cross over the level difference between the road and the parking lot when the vehicle crosses over the level difference.

5. The driving assistance apparatus according to claim 1, further comprising:
a vehicle speed detection section that is configured to successively detect vehicle speed of the vehicle,
wherein:
the threshold determination section sets the threshold to a larger value as the vehicle speed detected with the vehicle speed detection section is larger.

6. The driving assistance apparatus according to claim 1, further comprising:
a parking lot outside run estimation section that is configured to estimate whether or not the vehicle runs outside the parking lot,
wherein:
when the parking lot outside run estimation section estimates that the vehicle runs outside the parking lot, the level difference crossing determination section determines whether or not the vehicle has crossed over the level difference;
when the parking lot outside run estimation section estimates that the vehicle is not running outside the parking lot, the level difference crossing determination section is prohibited from determining whether or not the vehicle has crossed over the level difference; and
when determining that that the vehicle has crossed over the level difference, the level difference crossing determination section determines that the vehicle has entered the parking lot.

7. The driving assistance apparatus according to claim 6, wherein:
when the level difference crossing determination section determines that, after entering the parking lot, the vehicle has crossed over the level difference again, the level difference crossing determination section determines that the vehicle has exited the parking lot.

8. The driving assistance apparatus according to claim 6, further comprising:
a sudden acceleration suppression section that is configured to suppress acceleration of the vehicle when the level difference crossing determination section determines that the vehicle has entered the parking lot.

9. The driving assistance apparatus according to claim 8, further comprising:
a pedal improper operation detection section that is configured to detect an improper operation of an acceleration pedal of the vehicle; and
a braking force control section that is configured to increase a braking force of the vehicle in response to detection of the improper operation of the acceleration pedal by the pedal improper operation detection section after it is determined that the vehicle has entered the parking lot.

10. A driving assistance system comprising:
a first driving assistance apparatus that is the driving assistance apparatus recited in claim 9; and
a second driving assistance apparatus comprising:
a vehicle speed detection section that is configured to successively detect vehicle speed of the vehicle;
a parking lot entry possibility detection section that is configured to estimate whether or not the vehicle is going to enter a parking lot from a road;
an origin point determination section that is configured to determine a specific point as a point of origin of an absolute coordinate system, wherein the specific point is a point at which the parking lot entry possibility detection section estimates that the vehicle is going to enter the parking lot from the road;
a coordinate point calculation section that is configured to successively calculate a present coordinate point of the vehicle in the absolute coordinate system having the determined point of origin based on (i) the tire wheel speed, which is successively detected with the tire wheel speed detection section, and (ii) the turn direction and the degree of turn, which are successively detected with the turn state detection section;
an after-stop movement detection section that is configured to detect whether or not the vehicle starts moving after stopping or parking; and
an exit determination section that is configured to make an exit determination of whether or not the vehicle has exited the parking lot based on a positional relation between the point of origin and the coordinate point successively calculated by the coordinate point calculation section, wherein when the after-stop movement detection section detects that the vehicle starts moving after stopping or parking, the exit determination section makes the exit determination,
wherein:
when the exit determination section determines that the vehicle has exited the parking lot, suppression of the acceleration of the vehicle by the sudden acceleration suppression section is stopped and an increase in the braking force by the braking force control section is stopped.

11. The driving assistance apparatus according to claim 1, further comprising:
a parking lot entry possibility detection section that is configured to detect whether or not there is a possibility that the vehicle is going to enter the parking lot from the road,
wherein:
when the parking lot entry possibility detection section detects that there is the possibility that the vehicle is going to enter the parking lot from the road, the level difference crossing determination section determines whether or not the vehicle has crossed over the level difference;
when the parking lot entry possibility detection section does not detect the possibility that the vehicle is going to enter the parking lot from the road, the level difference crossing determination section is prohibited from determining whether or not the vehicle has crossed over the level difference; and
when determining that that the vehicle has crossed over the level difference, the level difference crossing determination section determines that the vehicle has entered the parking lot.

12. A driving assistance apparatus mounted to a vehicle, comprising:

a tire wheel speed detection section that is configured to successively detect tire wheel speed of a tire wheel of the vehicle;

a turn state detection section that is configured to successively detect a turn direction and a degree of turn of the vehicle;

a vehicle speed detection section that is configured to successively detect vehicle speed of the vehicle;

a parking lot entry possibility detection section that is configured to estimate whether or not the vehicle is going to enter a parking lot from a road;

an origin point determination section that is configured to determine a specific point as a point of origin of an absolute coordinate system, wherein the specific point is a point at which the parking lot entry possibility detection section estimates that the vehicle is going to enter the parking lot from the road;

a coordinate point calculation section that is configured to successively calculate a present coordinate point of the vehicle in the absolute coordinate system having the determined point of origin based on (i) the tire wheel speed, which is successively detected with the tire wheel speed detection section, and (ii) the turn direction and the degree of turn, which are successively detected with the turn state detection section;

an after-stop movement detection section that is configured to detect whether or not the vehicle starts moving after stopping or parking; and an exit determination section that is configured to make an exit determination of whether or not the vehicle has exited the parking lot based on a positional relation between the point of origin and the coordinate point, which is successively calculated by the coordinate point calculation section, wherein:

when the after-stop movement detection section detects that the vehicle starts moving after stopping or parking, the exit determination section makes the exit determination.

13. The driving assistance apparatus according to claim 12, wherein:

an axis along a left direction and a right direction of the vehicle at a certain point is set as a horizontal axis of the absolute coordinate system;

the certain point is a point where the parking lot entry possibility detection section estimates that the vehicle is going enter the parking lot from the road; and based on a displacement of the successively-calculated coordinate point from the point of origin in the horizontal axis, the exit determination section determines whether or not the vehicle has exited the parking lot.

14. The driving assistance apparatus according to claim 13, further comprising:

an exit direction estimation section that is configured to estimate whether or not an exit direction, in which the vehicle exits the parking lot, is a left direction or a right direction, wherein:

when the displacement of the successively-calculated coordinate point from the point of origin in the horizontal axis is in a predetermine threshold range, the exit determination section determines that the vehicle has exited the parking lot; and the predetermine threshold range depends on the exit direction estimated by the exit direction estimation section.

* * * * *